United States Patent
Shah et al.

(10) Patent No.: US 11,459,473 B2
(45) Date of Patent: *Oct. 4, 2022

(54) INK COMPOSITIONS FOR THREE-DIMENSIONAL PRINTING AND METHODS OF FORMING OBJECTS USING THE INK COMPOSITIONS

(71) Applicant: Northwestern University, Evanston, IL (US)

(72) Inventors: Ramille N. Shah, Hinsdale, IL (US); Adam E. Jakus, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,062

(22) Filed: Jan. 22, 2020

(65) Prior Publication Data
US 2020/0165472 A1 May 28, 2020

Related U.S. Application Data

(63) Continuation of application No. 15/310,858, filed as application No. PCT/US2015/030972 on May 15, 2015, now Pat. No. 10,584,254.

(60) Provisional application No. 61/993,360, filed on May 15, 2014, provisional application No. 62/143,951, filed on Apr. 7, 2015, provisional application No. 62/064,338, filed on Oct. 15, 2014.

(51) Int. Cl.
| | |
|---|---|
| *C09D 11/104* | (2014.01) |
| *C09D 11/033* | (2014.01) |
| *C09D 11/037* | (2014.01) |
| *B29C 64/165* | (2017.01) |
| *B33Y 10/00* | (2015.01) |
| *B33Y 70/00* | (2020.01) |
| *C09D 11/03* | (2014.01) |
| *B29K 67/00* | (2006.01) |
| *B29K 105/16* | (2006.01) |
| *B29K 505/00* | (2006.01) |
| *B29K 507/04* | (2006.01) |
| *B29K 509/02* | (2006.01) |
| *B29K 511/00* | (2006.01) |

(52) U.S. Cl.
CPC .......... *C09D 11/104* (2013.01); *B29C 64/165* (2017.08); *B33Y 10/00* (2014.12); *B33Y 70/00* (2014.12); *C09D 11/03* (2013.01); *C09D 11/033* (2013.01); *C09D 11/037* (2013.01); *B29K 2067/00* (2013.01); *B29K 2105/16* (2013.01); *B29K 2505/00* (2013.01); *B29K 2507/04* (2013.01); *B29K 2509/02* (2013.01); *B29K 2511/00* (2013.01); *B29K 2995/0046* (2013.01)

(58) Field of Classification Search
CPC ..... C09D 11/104; C09D 11/03; C09D 11/033; B33Y 10/00; B29K 2067/00; B29K 2995/0046
USPC ......................................................... 156/242
See application file for complete search history.

(56) References Cited

U.S. PATENT DOCUMENTS

| | | | |
|---|---|---|---|
| 5,518,680 A | 5/1996 | Cima et al. | |
| 5,868,823 A * | 2/1999 | Yamazaki | C09D 11/328 |
| | | | 106/31.58 |
| 6,582,651 B1 | 6/2003 | Cochran, Jr. et al. | |
| 6,664,006 B1 | 12/2003 | Munshi | |
| 7,087,109 B2 | 8/2006 | Bredt et al. | |
| 8,535,719 B2 | 9/2013 | Badylak et al. | |
| 8,691,276 B2 | 4/2014 | Badylak et al. | |
| 9,327,448 B2 | 5/2016 | Shah et al. | |
| 2001/0008317 A1 | 7/2001 | Gaylo et al. | |
| 2002/0103538 A1 | 8/2002 | Hughes et al. | |
| 2003/0151156 A1 | 8/2003 | Crumm et al. | |
| 2003/0236513 A1 | 12/2003 | Schwarz | |
| 2004/0186139 A1 | 9/2004 | Reddy et al. | |
| 2004/0241436 A1 | 12/2004 | Hsieh et al. | |
| 2005/0003189 A1 | 1/2005 | Bredt et al. | |
| 2005/0202058 A1 | 9/2005 | Hiles | |
| 2006/0292350 A1 | 12/2006 | Kawamura et al. | |
| 2008/0004359 A1 | 1/2008 | Ma et al. | |
| 2008/0145639 A1 | 6/2008 | Sun et al. | |
| 2008/0173214 A1 * | 7/2008 | Oyanagi | C09D 11/36 |
| | | | 106/31.25 |
| 2008/0268019 A1 | 10/2008 | Badylak et al. | |
| 2009/0068343 A1 * | 3/2009 | Ishida | G02F 1/133711 |
| | | | 427/58 |
| 2009/0075382 A1 | 3/2009 | Sachlos | |
| 2009/0117087 A1 | 5/2009 | Carroll et al. | |
| 2009/0117435 A1 | 5/2009 | Du et al. | |

(Continued)

FOREIGN PATENT DOCUMENTS

| | | |
|---|---|---|
| CN | 103910901 A | 7/2014 |
| EP | 0393747 | 10/1990 |

(Continued)

OTHER PUBLICATIONS

Hong, Microstructure and Mechanical Properties of Reticulated Titanium Scrolls, Advanced Engineering Materials, 2011, 13 No 12. (Year: 2011).*

(Continued)

*Primary Examiner* — Doris L Lee
(74) *Attorney, Agent, or Firm* — Hahn Loeser & Parks LLP

(57) ABSTRACT

3D printable ink compositions for forming objects, films and coatings are provided. Also provided are methods of printing the ink compositions and methods for making the ink compositions. The ink compositions include an elastic polymer binder and may have high loadings of solid particles.

40 Claims, 14 Drawing Sheets

(56) References Cited

U.S. PATENT DOCUMENTS

| | | | |
|---|---|---|---|
| 2009/0208466 | A1 | 8/2009 | Yoo et al. |
| 2010/0000441 | A1 | 1/2010 | Jang et al. |
| 2010/0096596 | A1 | 4/2010 | Lewis et al. |
| 2010/0136114 | A1 | 6/2010 | Mao |
| 2010/0267143 | A1 | 10/2010 | Park et al. |
| 2010/0279007 | A1 | 11/2010 | Briselden et al. |
| 2011/0064784 | A1 | 3/2011 | Mullens et al. |
| 2011/0196094 | A1 | 8/2011 | Hamad et al. |
| 2011/0223405 | A1 | 9/2011 | Compton et al. |
| 2013/0195955 | A1 | 8/2013 | Reichert et al. |
| 2013/0196405 | A1 | 8/2013 | Singh et al. |
| 2014/0023723 | A1 | 1/2014 | Leach et al. |
| 2014/0099556 | A1 | 4/2014 | Johnson et al. |
| 2014/0271961 | A1 | 9/2014 | Khoshnevis |
| 2014/0335144 | A1 | 11/2014 | Ward et al. |
| 2015/0012092 | A1 | 1/2015 | Schroeder et al. |
| 2015/0035209 | A1 | 2/2015 | Shah et al. |
| 2015/0037385 | A1 | 2/2015 | Shah et al. |
| 2015/0076732 | A1 | 3/2015 | Kemmer et al. |
| 2015/0125952 | A1 | 5/2015 | Kim et al. |
| 2015/0231302 | A1 | 8/2015 | Duvall et al. |
| 2015/0315449 | A1 | 11/2015 | Kim |
| 2016/0032062 | A1 | 2/2016 | Clauss et al. |
| 2017/0081534 | A1 | 3/2017 | Shah et al. |

FOREIGN PATENT DOCUMENTS

| | | |
|---|---|---|
| EP | 2195131 B1 | 10/2011 |
| JP | 1997(H9)-502999 A | 3/1997 |
| JP | 2006-504813 A | 2/2006 |
| JP | 2010-536694 A | 12/2010 |
| JP | 2010-537679 A | 12/2010 |
| WO | WO 95/11007 A1 | 4/1995 |
| WO | WO0069008 | 11/2000 |
| WO | WO 2004/028787 A1 | 4/2004 |
| WO | 2005114322 A2 | 12/2005 |
| WO | WO 2009/023226 A2 | 2/2009 |
| WO | 2009027525 A2 | 3/2009 |
| WO | WO 2009/027525 A2 | 3/2009 |
| WO | WO2013180662 | 12/2013 |
| WO | WO2014209994 | 12/2014 |
| WO | WO2014210584 | 12/2014 |
| WO | WO2015102746 | 7/2015 |

OTHER PUBLICATIONS

Levi et al., "Biodegradable Nano-Material Composites for Use in an Inkjet Printing System," Mater. Res. Soc. Symp. Proc., vol. 921, 2006, pp. 1-7.

Jakus et al., Three-dimensional printing of high-content graphene scaffolds for electronic and biomedical applications, ACS NANO, Apr. 10, 2015, vol. 9, No. 4, pp. 4636-4648.

Mar. 15, 2019 International Search Report & Written Opinion mailed in PCT/US2018/062595, 13 pages.

Dec. 14, 2020 Extended European Search Report mailed in European Application No. 20192563.3, 9 pages.

Aug. 26, 2015 International Search Report & Written Opinion issued for International Patent Appl. No. PCT/US2015/030972.

Jul. 12, 2016 International Search Report and Written Opinion mailed in PCT/US2016/026342.

Jul. 25, 2016 International Search Report and Written Opinion mailed in PCT/US2015/055773.

Sep. 2, 29017International Search Report and Written Opinion mailed in PCT Application No. PCT/US2017/042522.

Oct. 19, 2017 Extended European search report mailed in European Application No. 15792640.3.

Feb. 9, 2018 International Search Report and Written Opinion mailed in PCT/US2017/062218.

May 8, 2019 Office Action in connection with U.S. Appl. No. 15/310,858.

Ahn et al., Carbon-nanotube-interfaced glass fiber scaffold for regeneration of transected sciatic nerve, Acta Biomaterialia 13, Nov. 21, 2014, pp. 324-334.

Ahn et al., Printed Origami Structures, Advanced Materials 22, May 25, 2010.

Calvert et al., Solid freeform fabrication of organic-inorganic hybrid materials., Materials Science and Engineering: C 6.2, 1998, pp. 167-174.

Cesaretti et al., Building components for an outpost on the lunar soil by means of a novel 3D printing technology, Acta Astronautica, vol. 93, Aug. 8, 2013, pp. 430-450.

Das et al., Graphene-based polymer composites and their applications, Polymer-Plastics Technology and Engineering, Feb. 27, 2013, vol. 52, No. 4, pp. 319-331.

Falcade et al., Fuel Cell: A Review and a New Approach About YSZ Solid Oxide Electrolyte Deposition Direct on LSM Porous Substrate by Spray Pyrolysis, New Advances in Fundamental Researches and Applications, Dr. Yan Shao (Ed.), ISBN: 978-953-51-0032-4, InTech, Mar. 7, 2012, pp. 139-160.

Farandos et al., 3D Printing of Functional Layers for Solid Oxide Fuel Cells and Electrolysers, ECS Conference on Electrochemical Energy Conversion & Storage with SOFC-XIV, Jul. 26, 2015, Glasgow, Scotland.

Guo et al., Properties of polylactide inks for solvent-cast printing of three-dimensional freeform microstructures, Langmuir, Jan. 11, 2014, vol. 30, No. 4, pp. 1142-1150.

Hong et al., Microstructure and Mechanical Properties of Reticulated Titanium Scrolls, Advanced Engineering Materials, vol. 13, No. 12, 2011, pp. 1122-1127.

Jakus et al., 3D-Bioplotted Elastic Bone Scaffolds for Tissue Engineering Applications, Poster Presentation, Oral Biology Centennial, University of Chicago, Jun. 19, 2013.

Jakus et al., 3D-Printed Hyperelastic Bone for Hard-Tissue Engineering Applications, Abstract for Presentation at Hilliard Symposium, Northwestern University, May 15, 2014.

Jakus et al., 3D Printed Solid Oxide Fuel Cells from High Particle Content Liquid Inks, MRS Fall 2014 Meeting, Dec. 3, 2014.

Jakus et al., Biochemically Active Bioplotted Elastic Hydroxyapatite-Based Tissue Engineering Scaffolds: Structural, Mechanical, and in vitro Evaluation, Abstract for Presentation at TMS Pacific Rim International Congress on Advanced Materials and Processing Waikoloa, HA, Aug. 7, 2013.

Jakus et al., Bioplotted Ceramicsand Metals: A Universal Technique for Fabricating Complex, Ordered, and Functional Scaffolds, The 8th Pacific Rim International Congress on Advanced Materials and Processing, Abstract, Aug. 1, 2013.

Jakus et al., Bioplotted Elastic Hydroxyapatite-Based Tissue Engineering Scaffolds, Oral Presentation, TMS Pacific Rim International Congress on Advanced Materials and Processing, Waikoloa, HA, Aug. 6, 2013.

Jakus et al., A Single Platform 3D-Printing Approach for Fabricating Tissue Engineering Bio-Scaffolds from Multiple Material Systems, Oral Presentation, Materials Science and Engineering 2013 Hilliard Symposium, Northwestern University, Evanston, May 16, 2013.

Jakus et al., Three-dimensional printing of high-content grapheme scaffolds for electronic and biomedical applications, ACS NANO, Apr. 10, 2015, vol. 9, No. 4, pp. 4636-4648.

Jaycox et al., 3-D Printing Lunar and Martian Dusts From Liquid 3D-Inks, Poster Presentation at ASM Chicago on Apr. 8, 2014.

Kyriakidou et al., Dynamic Co-Seeding of Osteoblast and Endothelial Cells on 3D Polycaprolactone Scaffolds for Enhanced Bone Tissue Engineering, Journal of Bioactive and Compatible Polymers, vol. 23, May 2008, pp. 227-243.

Leigh et al., A simple, low-cost conductive composite material for 3D printing of electronic sensors, PLOS ONE, Nov. 21, 2012, vol. 7, No. 11, e49365, internal pp. 1-6.

Mendez-Ramos et al., Prospective use of the 3D printing technology for the microstructural engineering of Solid Oxide Fuel Cell components, Boletin de la Sociedad Espanola de Ceramica y Vidrio, vol. 53, Sep. 2014, pp. 213-216.

Michna et al., Concentrated hydroxyapatite inks for direct-write assembly of 3-D periodic scaffolds, Biomaterials, vol. 26, Apr. 21, 2005, pp. 5632-5639.

(56) References Cited

OTHER PUBLICATIONS

Shuai et al., Fabrication of porous polyvinyl alcohol scaffold for bone tissue engineering via selective laser sintering, Biofabrication, vol. 5, No. 015014, Feb. 6, 2013, pp. 1-8.
R. Shah, The Use of 3D Bioplotted Scaffolds and Ultrasonic Stimulation for Tissue Engineering, Oral Presentation, Oral Biology Centennial, University of Chicago, Jun. 19, 2013, slides 1-24.
Subramanian et al., Development of biomaterial scaffold for nerve tissue engineering: Biomaterial mediated neural regeneration, Journal of Biomedical Science, Nov. 25, 2009.
Sun et al., 3D Printing of Interdigitated Li-Ion Microbattery Architectures, Advanced Materials 25, Jun. 17, 2013, pp. 4539-4543.
S. Taylor, Lomiko Metals Announce 3D Printing Graphene Patent, Jan. 21, 2014.
A. Thorel, Tape Casting Ceramics for high temperature Fuel Cell applications, Ceramic Materials, Wilfried Wunderlich (Ed.), ISBN: 978-953-307-145-9, InTech, Sep. 28, 2010, pp. 49-68.
Yeo et al., Preparation and Characterization of 3D Composite Scaffolds Based on Rapid-Prototyped PCLβ-TCP Struts and Electrospun PCL Coated with Collagen and HA for Bone Regeneration, Chem. Mater., vol. 24, Jul. 5, 2011, pp. 903-913.
Zhao et al., 3D-Printing on Mars: Trade-off Between In-situ Spare Parts Production on Mars and Spare Parts Supply From Earth, Jul. 2014.
CA2950890 Office Action dated Oct. 8, 2021, 3 pages.

\* cited by examiner

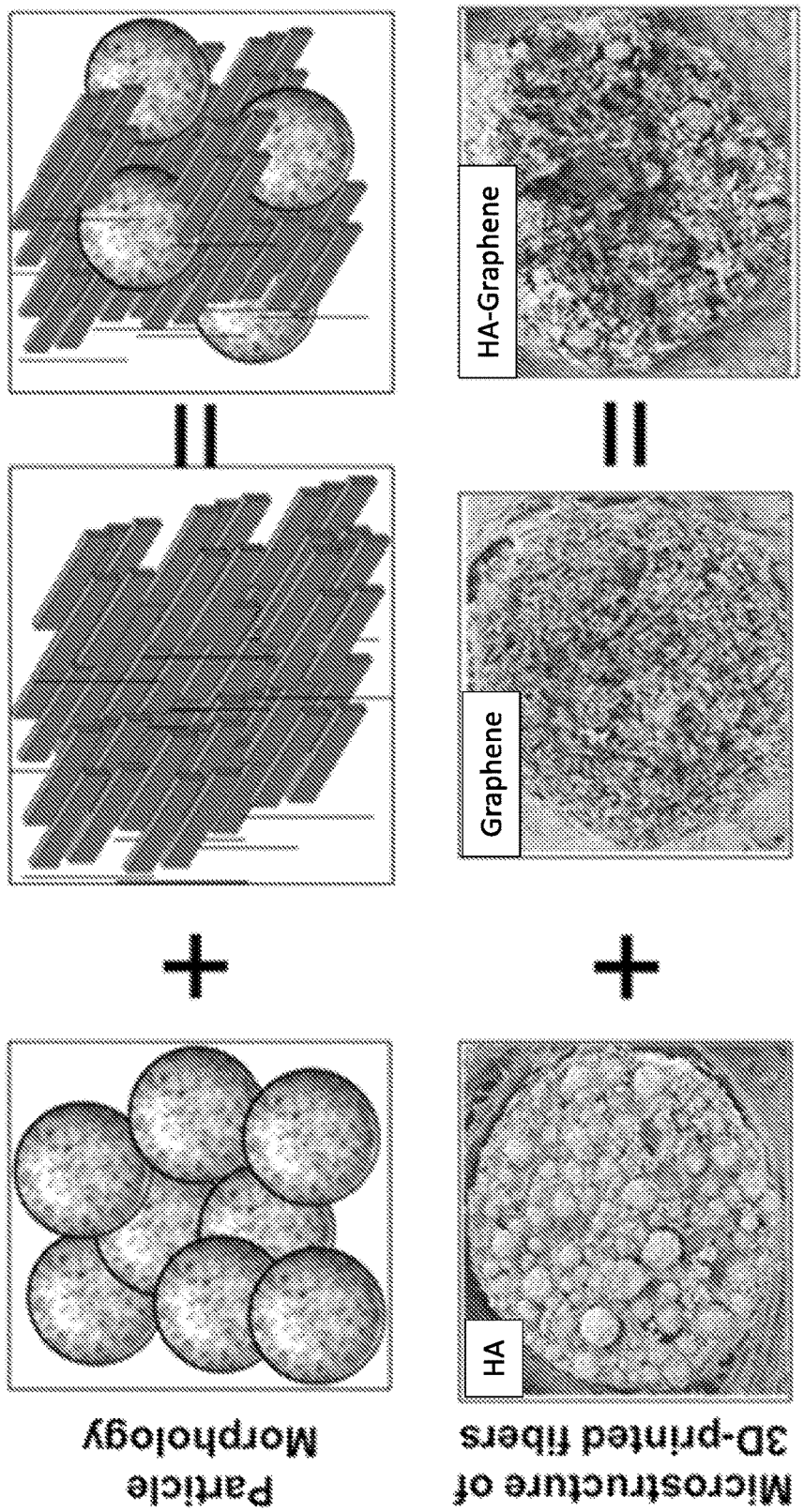
FIG. 2 Particle Morphology
FIG. 3 Microstructure of 3D-printed fibers

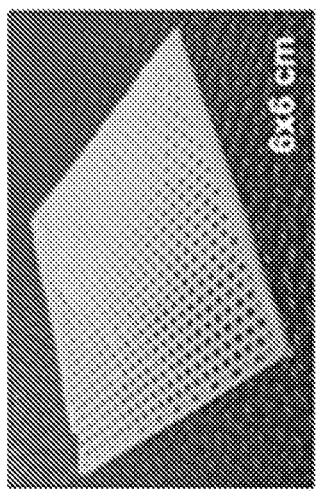
FIG. 17
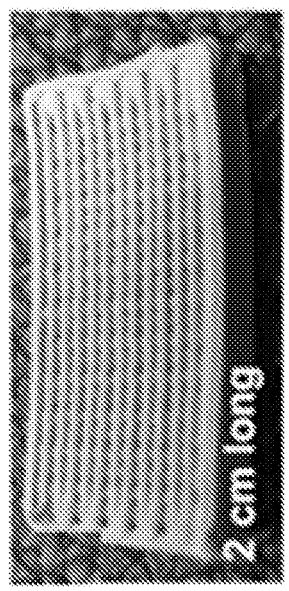
FIG. 16
FIG. 15
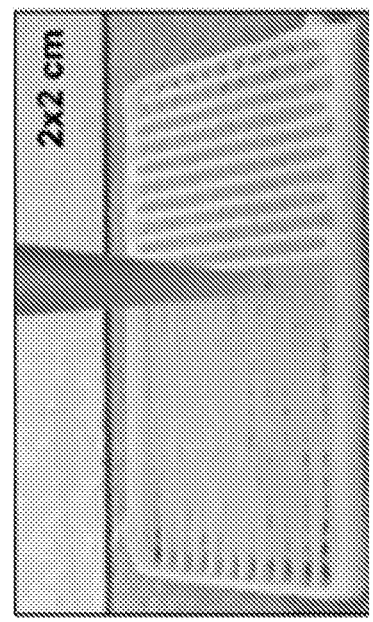
FIG. 19
FIG. 18

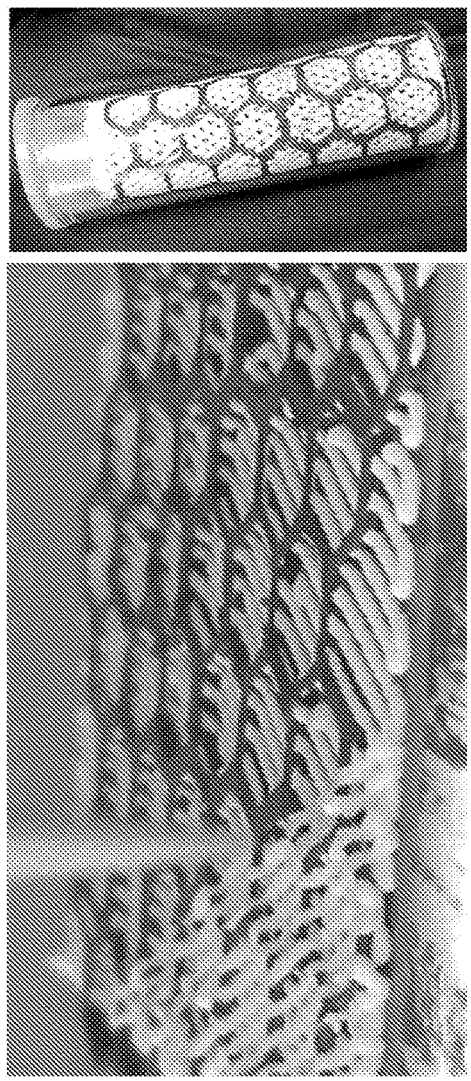
FIG. 24B
FIG. 24A
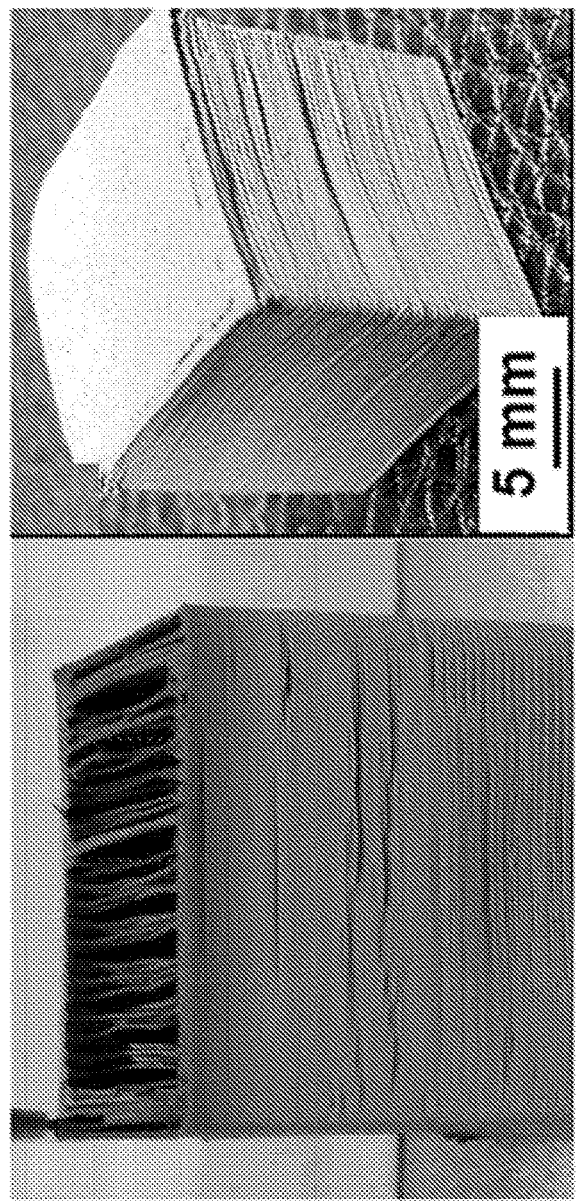
FIG. 26
FIG. 25

INK COMPOSITIONS FOR THREE-DIMENSIONAL PRINTING AND METHODS OF FORMING OBJECTS USING THE INK COMPOSITIONS

CROSS-REFERENCE TO RELATED APPLICATIONS

The present application is a continuation of and claims priority to and the benefit of application Ser. No. 15/310,858 filed Nov. 14, 2016, which is a National Stage of International Application No. PCT/US2015/030972 that was filed on May 15, 2015, which claims the benefit of U.S. Patent Application No. 61/993,360 that was filed on May 15, 2014, U.S. Patent Application No. 62/143,951 that was filed on Apr. 7, 2015 and U.S. Patent Application No. 62/064,338 that was filed on Oct. 15, 2014; the contents of which are herein incorporated by reference.

REFERENCE TO GOVERNMENT RIGHTS

This invention was made with government support under DMR1121262 awarded by the National Science Foundation and N00014-11-1-0690 awarded by the Office of Naval Research. The government has certain rights in the invention.

BACKGROUND

Additive manufacturing and three-dimensional (3D) printing technologies currently suffer from a number of deficiencies. For example, these technologies are compatible with only a limited number of materials and typically require expensive and complex equipment that is run by highly skilled operators. In addition, attempts to develop ink compositions suitable for rapidly printing multilayered, high aspect ratio 3D objects from a wide variety of materials have met with little success.

SUMMARY

Ink compositions for forming three dimensional objects, films and coatings are provided. Also provided are methods of forming objects using the ink compositions and methods for making the ink compositions.

One embodiment of an ink composition comprises: a solvent system comprising at least about 50 vol. % dichloromethane, chloroform, or a mixture thereof and at least one additional organic solvent having a lower vapor pressure at 23° C. than the dichloromethane, chloroform, or a mixture thereof; a polyester polymer that is soluble in the solvent system at 23° C.; and solid particles that are insoluble in the solvent system at 23° C. The ink composition comprises at least about 50 vol. % of solid particles based on its solids content.

One embodiment of a method for forming a three-dimensional printed object, comprises the steps of: (a) extruding an ink composition through a nozzle to form a printed layer; and repeating step (a) to form a printed object comprising multiple, vertically stacked printed layers. The ink composition used in this method comprises: a solvent system comprising at least about 50 vol. % of a primary organic solvent having a vapor pressure in the range from 20 to 60 kPa at 23° C. and atmosphereic pressure, and at least one additional organic solvent having a lower vapor pressure at 23° C. and atmospheric pressure than the primary organic solvent; a polyester polymer that is soluble in the solvent system at 23° C.; and solid particles that are insoluble in the solvent system at 23° C. The the ink composition comprises at least about 50 vol. % of solid particles based on its solids content.

One embodiment of a method for forming a multi-part, three-dimensional printed object comprises the steps of: forming a first three-dimensional printed object using the method described above; forming a second three-dimensional printed object using the method described above; applying the ink composition used to make the first or second three-dimensional printed objects to a surface of at least one of the first or second three-dimensional printed objects; contacting the other of the first or second three-dimensional printed objects to the applied ink composition; and allowing the solvents in the solvent system to evaporate to form the multi-part, three-dimensional object comprising the first three-dimensional printed object bonded to the second three-dimensional printed object.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 2. Schematic diagram of the morphologies of hydroxyapatite particles (left panel), graphene flakes (middle panel), and a mixture of both (right panel).

FIG. 3. Scanning electron microscope (SEM) images of printed fibers comprising hydroxyapatite particles (left panel), graphene flakes (middle panel), and a mixture of both (right panel).

FIG. 15. A portion of an artificial spine printed from an ink composition comprising 75 vol. % of the bioceramic HA.

FIG. 16. A multilayered sheet printed from an ink composition comprising 80 vol. % diatom skeleton particles.

FIG. 17. A sheet printed from an ink composition comprising 70 vol. % pollen particles.

FIG. 18. A multilayered sheet printed from an ink composition comprising a mixture of 75 vol. % HA and 5 vol. % vancomycin antibiotic powder.

FIG. 19. A multilayered sheet in the process of being 3D printed from an ink composition comprising a mixture of HA and bone extra cellular matrix.

FIG. 24A. Three vertically-stacked layers of a sheet being printed from: (i) an ink composition comprising 70 vol. % HA (white; first and third layers); and (ii) an ink composition comprising 60 vol. % graphene (black; second layer).

FIG. 24B. The sheet of FIG. 24A rolled and inserted into a glass vial.

FIG. 25. Continuous fibers printed across the opening of a box.

FIG. 26. An enclosed, hollow box printed using an ink composition comprising 70 vol. % $Fe_2O_3$.

DETAILED DESCRIPTION

Figure 1:
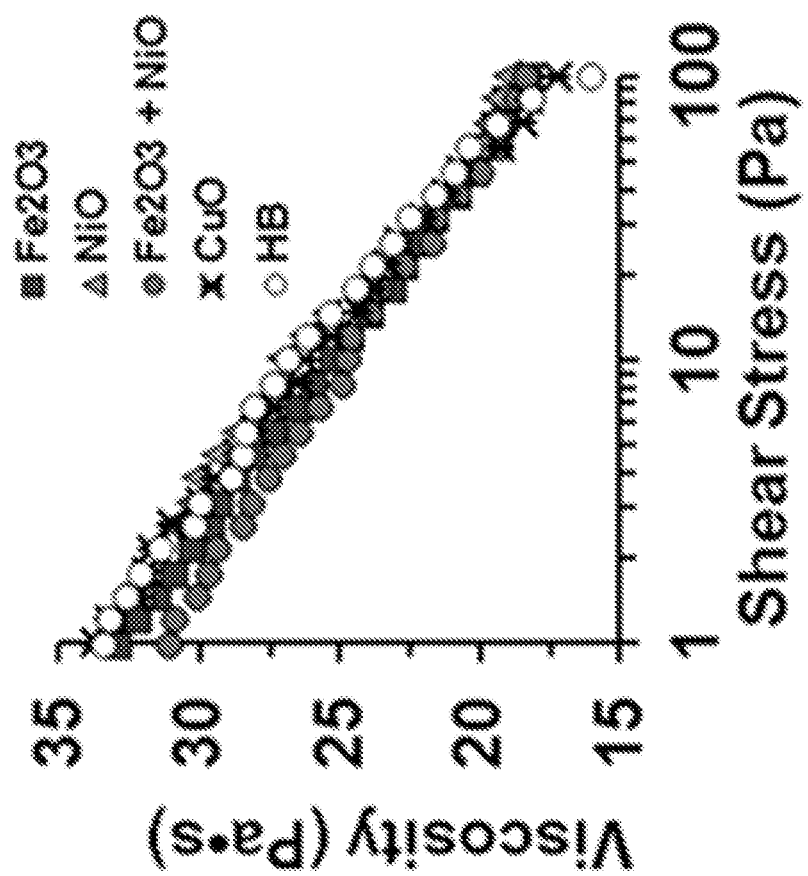
FIG. 1. Graph of the viscosity as a function of shear stress for 3D ink compositions comprising various types of particles.

Ink compositions for forming 3D objects, films and coatings are provided. Also provided are methods for forming the 3D objects from the ink compositions and methods for making the ink compositions.

The ink compositions are characterized in that they can be 3D printed via extrusion under ambient conditions into self-supporting fibers that form self-supporting 3D objects and architectures. Self-supporting strands and structures formed by printing the ink compositions are characterized in that they substantially retain the 3D shape imparted to them by the extrusion process. For this reason, the inks may be referred to as "3D ink compositions". Objects that can be printed using the 3D ink compositions include high aspect ratio objects that extend outwardly from the surface upon which they are printed. In addition, the printed objects may be removed from the substrate upon which they are printed, while remaining structurally intact. As such, the present ink compositions differ from ink compositions used in two-dimensional (2D) printing to form very thin films of text or patterns on the surface of a substrate.

The ink compositions comprise small volume fractions of elastic polymer (elastomer) as a binder. The use of such binders promotes the robustness of objects, films and coatings formed from the ink compositions. In addition, when the ink compositions are extruded, the elastomeric binders provide for the formation of extruded stands that are continuous, flexible and strong. As a result, the ink compositions enable precise 3D printing of objects having extreme curvatures and/or allow extruded strands to be deposited over large, open gaps. This, in turn, enables 3D printing of architectures with complex and unsupported features. Moreover, 3D structures formed from the ink compositions can adopt, at least in part, the elastomeric properties of the elastic polymer binders. Thus, some embodiments of objects, films or coatings that are formed from the ink compositions have strongly elastic or hyperelastic mechanical properties, which allow them to 'bounce back' to their original shape after undergoing loading (e.g., compression or tension). In other embodiments, the objects, films or coatings, while not elastic, are flexible. That is, they can be deformed without breaking and retain their deformed shapes.

The ink compositions comprise: a solvent system comprising one or more organic solvents; an elastic organic polymer that is soluble in the solvent system; and solid particles of a material that is insoluble in the solvent system.

The solvent system and elastic organic polymer provide a substantially universal solution into which different particles and combination of particles can be incorporated, regardless of the composition of the particles. Therefore, the solid particles in the ink composition can comprise a broad range of materials and combinations of different materials, provided they are insoluble or substantially insoluble in the solvent system. For example, the solid particles may be ceramic particles (e.g., metal oxides and oxides of non-metal elements), metal particles, metal alloy particles, organic (e.g., polymer) particles, magnetic particles, carbon particles (e.g., carbon nanotubes, graphene flakes or powders and graphite), salt particles (e.g., metallic sulfates, fluorates, chlorates, carbonates) natural soil particles (e.g., planetary soils particles), and naturally occurring particles derived from biological sources (e.g., decellularized extracellular matrix (ECM) particles and mammalian and plant proteinaceous particles) or any combination of these—including mixtures of inorganic particles with organic particles. Some such particles may be biologics (e.g., decellularized extracellular matrix, proteins, or drugs). The ceramic particles may be complex ceramics. For the purposes of this disclosure, a complex ceramic is an ionic solid with a single crystalline structure under any given condition and is comprised of multiple cationic, anionic, or cationic and anionic species. A bioceramic is defined as a ceramic that is suitable for biological applications (i.e., it is biocompatible) or a ceramic having a composition that is naturally produced by living organisms.

The particles may have a broad range of sizes and shapes, including both regular, symmetric shapes and irregular shapes. For example, they may be substantially spherical (i.e., spherical or very close to spherical allowing for some imperfections; e.g., nanospheres or certain irregularly-shaped granules), elongated cylindrical (e.g., fibers, nanowires, and nanorods), plate-like (e.g., sheets, flakes and platelets) with dimensions in the range from 10 nm (or smaller) to one mm (or larger). In some embodiments, the ink compositions include particles having significantly different shapes and sizes, which can comprise the same or different materials. For example, an ink composition may comprise two or more of the following: cylindrical particles, substantially spherical particles and plate-like particles. Similarly, one set of particles in the ink composition may be have an average diameter (or smallest dimension) in the nanoscale regime (i.e., <1000 nm), while another set of particles has an average diameter (or smallest dimension) in the microscale regime (i.e., >1 µm). As used herein the term "solid particles" refers to particles that comprise a solid material, as opposed to a liquid (e.g., a droplet). However, the "solid particles" need not be completely solid through their interior. For example, "solid particles" includes porous particles and hollow particles.

The solvent system is a graded solvent comprises a primary organic solvent that has a high vapor pressure, and therefore evaporates rapidly, at room temperature and atmospheric pressure (101.3 kPa). The solvent system further comprises one or more additional organic solvents having lower vapor pressures than the primary solvent at room temperature. Suitably high vapor pressures at room temperature and atmospheric pressure include those in the range from about 20 kPa to about 60 kPa, which includes those in the range from about 25 kPa to about 55 kPa. Moreover, if printing is carried out at pressures lower than atmospheric pressure (for example in vacuum or on a lunar or extraterrestrial surface), other lower volatility solvents, even water, could be used.

Some embodiments of the solvent systems comprise dichloromethane (DCM) as a primary solvent, which may be used in combination with one or more additional organic solvents. The use of DCM is advantageous because, upon extrusion of the ink composition, DCM, which is a very high volatility solvent, evaporates very rapidly, leaving a solid, continuous fiber. Chloroform is another example of a suitable primary organic solvent. The primary solvent is the majority solvent in the solvent system. That is, it accounts for at least 50% by volume (vol. %) of the solvents in the solvent system. In some embodiments, the primary organic solvent accounts for at least 70 vol. % of the solvent system. This includes embodiments in which primary organic solvent accounts for at least 90 vol. % of the solvent system.

The additional organic solvents desirably have vapor pressures that are lower than that of DCM at the desired printing or deposition temperature (e.g., room temperature—about 23° C.). As a result, the additional organic solvents evaporate more slowly over time, but permit adjacent layers to merge together during deposition, resulting in a single, monolithic structure with strong interlayer adhesion and fidelity. Some embodiments of the solvent systems comprise an additional solvent that is a surfactant, an additional solvent that is a plasticizer, or a combination of at least two additional solvents—one of which is a surfactant and the other of which is a plasticizer. 2-butoxyethanol (2-Bu) and dibutylphthalate (DBP) are examples of additional organic solvents that may be included in the solvent system. In solvent systems comprising DBP, the DBP acts as a surfactant. However, other organic surfactants can be used in place of, or in combination with, the DBP. In solvent systems comprising 2-Bu, the 2-Bu acts as a plasticizer. However, other organic plasticizers can be used in place of, or in combination with, the 2-Bu. Some of the ink compositions consist essentially of, consist of only, a primary solvent, a second solvent that acts as a plasticizer and a third solvent that acts as a surfactant. For example, some of the ink compositions consist of, or consist essentially of, DCM, 2-Bu and DBP. For ink compositions comprising both a plasticizer and a surfactant the preferred mass ratio of the plasticizer to the surfactant will depend, at least in part, on the printing or coating conditions and equipment being used. By way of illustration only, in some embodiments of the solvent systems, the molar ratio of plasticizer to surfactant (e.g., 2-Bu to DBP) is in the range from about 1:1 to about 4:1. This includes embodiments in which the molar ratio is in the range from about 1:2 to about 2:1.

The elastic polymers provide a binder that helps to hold the particles together in the final printed or deposited object, film or coating. The elastic polymers are characterized by the property of elasticity. The elastic polymers should be soluble or substantially soluble in the solvent system at the intended printing temperature, but are desirably insoluble or substantially insoluble in water at the intended printing temperature, or a higher temperature. Depending on the application of the objects that are to be formed from the ink compositions, the elastic polymer binders may be biodegradable and/or biocompatible elastic polymers. The elastic polymer may comprise, for example, a polyester, a polymethacrylate, a polyacrylate, a polyethylene glycol, or a combination of two or more thereof. Examples of suitable polyester polymers that can be included in the ink compositions are polylactic acid (PLA), glycolic acid, copolymers of PLA and glycolic acid (i.e., polylactic-co-glycolic acid (PLGA)), and polycaprolactone (PCL). Some embodiments of the ink compositions comprise blends of one or more of these polyesters with other polyesters or with one or more non-polyester elastomeric polymers.

Only small quantities of the elastic binder are needed to provide printed (or otherwise deposited) 3D structures that are flexible, strong and elastic. For example, some embodiments of the ink compositions comprise no greater than about 50 vol. % binder, based on the solids content of the ink composition. This includes ink compositions that comprise no greater than about 40 vol. %, no greater than about 20 vol. % and no greater than about 10 vol. % of the polymer binder, based on the solids content of the ink compositions. (Note: because the non-solids content of the ink compositions (the solvents) eventually evaporate from structures formed from the ink compositions, the values for the vol. % based on solids content of the ink compositions also reflect the total vol. % for the final structures.)

The ink compositions and, therefore, the objects formed from the ink compositions, are characterized by high particle loadings. For example, some embodiments of the ink compositions have a solid particle content of at least 50 vol. % based on the solids content of the ink composition. This includes embodiments of the ink compositions that have a solid particle content of at least 60 vol. %, at least 80 vol. % and at least 90 vol. %, based on the solids content of the ink composition.

The ink compositions can be made simply by mixing the solvents of the solvent system, the binder polymers and the solid particles with excess primary solvent (for example, DCM) and allowing the primary solvent to evaporate until the ink composition has achieved a viscosity suitable for deposition. This process can be conducted at room temperature and under atmospheric conditions. Suitable viscosities will depend on the intended method of deposition and the deposition equipment (e.g., printer nozzle diameter). For example, if the ink composition is intended for use as a 3D printing ink, it should have a viscosity suitable for 3D printing via extrusion through a print nozzle. By way of illustration only, some embodiments of the 3D ink compositions that are suitable for 3D printing have a viscosity in the range from about 25 Pa·s to about 40 Pa·s at room temperature. (For coating applications the viscosities are generally lower, typically in the range from about 1 Pa·s to about 5 Pa·s at room temperature.) Due to its simplicity, this ink composition formulation process is highly scalable. Quantities as small as, for example, a few milliliters or as large as, for example, many gallons or tons may be produced. The ink compositions are storage stable. For example, some embodiments of the ink compositions can be stored for a period of at least six months at room temperature without observable separation of the ink composition components and/or particle agglomeration.

A single ink composition may comprise more than one type of particle. Such mixed-particle ink compositions can be made by combining different types of particles with the solvent system and elastic polymer binder to make the single ink composition comprised of multiple particle types. Alternatively, two or more starting ink compositions, each comprising different particle types, can be synthesized separately and then combined to create a final ink composition comprised of multiple particle types.

The ink compositions can be used to form a variety of three-dimensional objects, films and coatings using a variety of deposition methods. The printing and other deposition methods can be carried out at, or near, room temperature and ambient pressure. Typically, the printing temperature will be from about 20° C. up to about 40° C. However, printing can be carried out at higher or lower temperatures—although it should generally be carried out at temperatures below the boiling points of the solvent system.

Notably, the flexible or elastic nature of the printed objects is retained over very long periods and does not require the printed materials to be rewetted with solvents after they have dried in order to restore their pliability. Thus, the printed objects can be rolled, folded or otherwise mechanically manipulated and handled—without deforming the objects—immediately (for example, within 2 or 3 seconds) after they are printed and can still be mechanically manipulated after periods of days (e.g., at least 2 days), weeks (e.g., at least 2 weeks), months (e.g., at least 2 months) or years (e.g., at least 2 years) in a dry state, without the need to re-wet the objects with solvents in order to restore their pliability.

The ink compositions can be used to print objects using a 3D printer and layer-by-layer deposition, where a 3D printer is a printer capable of direct extrusion of an ink composition through a nozzle upon the application of pressure (e.g., via mechanical or pneumatic pressure) to the ink composition, which is held in a container (e.g., a syringe or print head) that is in fluid communication with the nozzle. This type of printing is sometimes referred to as "Direct Ink Writing" (DIW). Notably, using the present ink compositions many layers can be printed in this layer-by-layer printing technique to form high aspect ratio structures. By way of illustration, objects such as these can be printed with aspect ratios of at least 5:1, at least 10:1, at least 100:1, at least 1000:1, or even greater, and can have heights of greater than 1 cm, greater than 10 cm, greater than 1 m, or even higher. These high aspect ratios and heights can be achieved in the objects as printed, without the need to fold, roll or otherwise reconfigure a low aspect ratio printed object, such as a planar sheet, after it is printed. As such, the present ink compositions can be distinguished from those that print strands of material that undergo substantial flattening out before they solidify and, therefore, allow only one or a few layers of material to be printed before the shape or structural integrity of the object being printed is deformed (e.g., slumps).

The ability of the ink compositions to print many layered, high aspect ratio structures can be attributed to the kinetics of the graded solvent evaporation during printing. The primary solvent in particular evaporates almost immediately leaving a solid, self-supporting printed strand (also referred to as a fiber) from which the additional solvents evaporate more slowly. This makes it possible to print subsequent layers on top of previously printed layers almost immediately, without the need for a significant drying interval between layers, to provide well-defined, multilayered structures. Without intending to be bound to any particular theory of the inventions disclosed herein, the inventors believe the surprisingly rapid solidification of the ink composition can be attributed to the kinetics of the graded evaporation of solvents, which modulate the resulting precipitation of the previously dissolved polymer around the particles. This fast evaporation of the primary solvent is also achieved with ink compositions comprising low molecular weight polyethylene as the binding, although it is not an elastic polymer.

In one embodiment of a printing process, the ink composition is loaded into an ink cartridge of a 3D printer and extruded onto a substrate through the orifice in one or more print nozzles via pneumatic or mechanical pressure. Upon extrusion, solvents in the solvent system evaporate—as described above—and a solid, continuous fiber is formed. Layer-by-layer deposition of such fibers can be used to form 3D objects with overall architectures previously defined through computer aided design (CAD) drawings and internal architecture designed using 3D printer specific software or CAD designs. Because the printed strands and the objects made therefrom are self-supporting, CAD drawings can be reproduced with a very high degree of accuracy. The printed objects and the printed fibers from which they are formed can be composed of a single binder and/or solid particle material. Alternatively, different portions of the object and different printed strands can be composed of different binders and/or solid particle materials. Such multi-materials objects can be 3D printed via multi-extrusion tool platforms, wherein different print heads and/or different nozzles contain different ink compositions. The substrates upon which the objects can be printed are not limited, but may depend on the nature of the object being printed and its intended application. Illustrative examples of suitable substrate materials include glass, metal, plastics, paper, sandpaper, semiconductors, dielectrics and ceramics.

The optimal or possible printing rates for the ink compositions will depend on the the printing conditions and temperatures and the nature of the object being printed. By way of illustration only, in some embodiments of the printing processes, the ink compositions are printed at rates in the range from 0.1 mm/s to 150 mm/s.

Because the elastic polymer binder is soluble in the solvent system, the solvent system (or one or more solvents that make up the solvent system) can be used to selectively remove portions of a printed object after it is printed in order to alter its form. For example, DCM could be precisely applied to selected parts of a printed object to dissolve those parts.

For ink compositions comprised of non-water soluble elastic polymer binders and solid particles, co-support printing can be used to make complex 3D objects with unsupported features. Such features include, for example, overhangs and covers (e.g., ceilings) over hollow cavities. In co-support printing, sacrificial support structures are printed and used as temporary substrates upon which the present ink compositions are printed. Once the object is formed with the sacrificial support structures in place, those structures can be selectively removed by submerging the object in water (or otherwise exposing it to water), leaving the non-water soluble portions of the object intact. Co-support printing is a technique that is well suited for the fabrication of complex objects, including objects with unsupported structures.

Other, non-extrusion-based methods for depositing the ink compositions include coating the ink compositions onto a substrate and allowing the solvents in the solvent system to evaporate. Suitable coating processes include painting an ink composition onto a substrate and coating a substrate with an ink composition via dip coating or spin coating. For example, the ink compositions can be used to create thin, particle-laden films via dip coating or can be used to coat existing bulk objects. Thicker coatings can be built up on a substrate using multiple dip coating steps to form a multi-layered coating. These coatings can comprise multiple layers formed from the same ink composition or from different ink compositions.

In addition, because the ink compositions solidify almost immediately upon extrusion and bond to previously deposited layers, separately printed object parts—including object parts that are themselves printed using the present 3D ink compositions—can be fused together using the 3D ink compositions as a self-adhesive. In these applications, the ink compositions not only act as an adhesive, but also seamlessly meld the objects together at the location of deposition. As a result, extremely complex or very large 3D objects that could otherwise not be easily 3D printed directly can be created by seamlessly fusing parts together with the same ink composition that comprises the parts themselves. The use of an ink composition as a self-adhesive is illustrated with respect to the fabrication of a skull with a spine and jaw in the example below. Additional solvent (e.g., DCM) may be directly applied in small quantities to printed objects to selectively remove (i.e., dissolve) material.

EXAMPLES

The following examples illustrate the formulation of ink compositions comprising an elastic polymer binder and further illustrate 3D printing and dip coating methods that can be used to form complex 3D objects using the ink compositions.

The 3D ink compositions were produced by adding the selected solid particles (powders) in relevant quantities to a solvent system comprised of 2:1 by mass of 2-Bu and DBP with DCM in excess (roughly 8 times as much DCM as 2-Bu; exact amount is not critical as excess DCM will be evaporated off later). 0.9 g 2-Bu was added per $cm^3$ powder. As an example, 5 $cm^3$ powder would require 4.5 g 2-Bu, 2.25 g DBP, and approximately 36 g DCM. This powder suspension was thoroughly mixed to homogeneously distribute the particles throughout the mixed solvents. This particle suspension was added to the DCM solution containing the desired elastomer in solubilized form. The exact amount of DCM depended on the type and amount of elastic polymer to be dissolved. The final solutions had low viscosities (not much higher than water) to render them amenable to easy physical mixing with the powder suspensions. The combined mixture was then physically stirred at room temperature while left open to the environment, permitting excess DCM to evaporate and the ink composition to thicken over time until it achieved a viscosity of ~30 Pa·S. The final viscosity may be higher if the ink composition is intended to be extruded out of a nozzle wider than 400 μm, or lower for a nozzle smaller than 400 μm. The ink compositions could be sealed and stored in the dark between 4 and 25° C. until use. The longest storage period tested prior to successful use was 6 months. However, there was no indication that the ink compositions would not be stable for much longer periods.

In terms of relative quantities of powder to polymer binder, all protocols were designed using vol. %. This permits the process to be easily adapted to powdered materials with a broad range of densities. Therefore, even if the powder mass is different between materials systems, as long as the total powder volume between compositions is consistent, they may be prepared in the same manner. Ink compositions were prepared with solid particle vol. % between 60 and 90%. The remaining vol. % of solids was comprised of the elastic polymer binder. Solvent volume was not taken into account for this calculation. Only solids content was considered, as the final printed object will ultimately only be composed of the powder and polymer. For example, a 60 vol. % graphene (density=2.2 $g/cm^3$) ink composition with 40 vol. % polylactic-co-glycolic acid (PLGA) polymer binder (density=1.15 $g/cm^3$) was prepared to contain a total of 4 $cm^3$ solids content. 60% of 4 $cm^3$ is 2.4 $cm^3$, which is equal to 5.28 g graphene. 40% of 4 $cm^3$ is 1.6 $cm^3$, which is 1.84 g PLGA. These and other 3D ink compositions that were prepared according to the procedure described above are listed in Table 1, which lists the particle type and particle content for each ink composition. (Table 1 is intended to provide an illustrative, but not exhaustive, list of the types of particles and particle combinations that can be included in the ink compositions.) PLGA made up the remainder of the solids content of each of the ink compositions. In order to illustrate the broad range of colors that can be achieved by the ink compositions and the objects printed from the ink compositions, the table also lists the colors of some of the ink compositions.

TABLE 1

Illustrative 3D Ink Compositions

| PARTICLE TYPE | VOL. % OF PARTICLES, BASED ON TOTAL VOLUME OF PARTICLES AND PLGA | COLOR |
|---|---|---|
| *3D Ink Compositions Made with Ceramic Particles* | | |
| Hydroxyapatite (HA) | 70% and 75% | white |
| $Fe_2O_3$-doped Yttria-stabilized zirconia (YSZ) (1 mmol. $Fe_2O_3$) | 70% | pink |
| NiO + YSZ (1:1 by mass YSZ and NiO) | 70% | light green |
| Lanthanum strontium manganite (LSM) | 70% | black |
| *3D Ink Compositions Made with Metal Particles* | | |
| Iron (Fe) | 70% | gray |
| Nickel (Ni) | 70% | gray |
| Cobalt (Co) | 70% | gray |
| Aluminum (Al) | 70% | gray |
| Gold (Au) (a noble metal) | 70% | |
| Silver (Ag) (a noble metal) | 70% | |
| *3D Ink Compositions Made with Metal Oxide Particles* | | |
| Iron Oxide ($Fe_2O_3$) | 70%, 80% and 90% | orange/red |
| Nickel Oxide (NiO) | 70% | light green |
| Copper Oxide (CuO) | 70% | black |
| Iron Oxide-Nickel Oxide mixture ($Fe_2O_3$ + NiO) | 70% (50% + 20%) | orange/red |
| *3D Ink Compositions Made with Salt Particles (e.g., non-oxide metal compounds)* | | |
| Molybdenum Sulfide ($MoS_2$) | 60% | dark green |
| Copper Sulfate ($CuSO_4$) | 60% | blue |
| *3D Inks Compositions Made with Carbon Particles* | | |
| Graphite | 60% | black |
| Graphene | 60% and 65% | black |
| Carbon Nanotubes (CNTs) | 60% | black |
| *3D Ink Compositions Made with Naturally Occurring Particles/Bioparticles* | | |
| Pollen (a natural porous protein) | 70% | yellow |
| Planetary Soils (represented by a lunar simulant, which is described below) | 80% | |
| Diatom skeletons (natural hollow glass particles) | 80% | white to pink/orange |
| Decellularized extracellular Matrix (ECM) derived from cardiac, liver, brain, kidney, ovary, testicle, skin, muscle, bone, pancreas, intestinal, ocular, nerve, cartilaginous tissues. | 70% | yellow |
| *3D Ink Compositions Made with Mixtures of Different Particle Types* | | |
| HA-Graphene | 35%-35% | dark gray |
| HA-Vancomycin antibiotic | 75%-5% | white |
| HA-ECM derived from bone | 50%-50% | white/light yellow |

Planetary soils are a type of natural soil, which is a class of particles that can be used in the ink compositions. The natural soils comprise a homogeneous mixture of many naturally occurring solid particles, which can comprise a broad range of materials and combinations of different material, including organic materials. Examples of inorganic materials that may be included in the soils include regolith, coarse to fine sand, silt, clay, and smaller inorganic colloidal particulates. These types of natural particulates are highly ubiquitous on both Earth and extraterrestrial planetary bodies, such as the Moon and Mars. Many extraterrestrial soils will comprise high concentrations of silicon oxides and/or aluminum oxides with small concentrations of one or more reducible metal oxides, such as iron oxides. By way of illustration, some embodiments of the soils comprise about 30 to about 60 weight percent (wt. %) $SiO_2$, about 10 to about 30 wt. % $Al_2O_3$ and about 1 to about 20 wt. % iron oxides (i.e., FeO and/or $Fe_2O_3$). In addition, the terrestrial soils will typically comprise a variety of other inorganic and organic particulate matter in smaller concentrations.

A lunar simulant soil was used to represent the planetary soil particles in the ink composition in Table 1. By way of illustration, Tables 2 and 3 provide the compositions of the lunar simulant soil and a Martian simulant soil.

TABLE 2

Lunar Dust Simulant Composition

| Compound | Weight % |
| --- | --- |
| $SiO_2$ | 46 |
| $Al_2O_3$ | 15.75 |
| $Fe_2O_3$ | 12.2 |
| FeO | 8.17 |
| $TiO_2$ | 1.7 |
| CaO | 9.9 |
| $Na_2O$ | 2.8 |

$\rho_{Lunar}$ = 3.53 g/cm$^3$

TABLE 3

Martian Dust Simulant Composition

| Compound | Weight % |
| --- | --- |
| $SiO_2$ | 40 |
| $Al_2O_3$ | 22 |
| $Fe_2O_3$ | 11 |
| FeO | 3 |
| $TiO_2$ | 3.5 |
| CaO | 5.5 |
| $Na_2O$ | 2 |

$\rho_{Martian}$ = 3.50 g/cm$^3$

The 3D ink compositions could be prepared in larger quantities with relative ease. For example, a one liter (1 L) batch of an ink composition comprising 70 vol. % $Fe_2O_3$ particles and 30 vol. % PLGA binder, based on solids content, was prepared. This illustrates the scalability of the methods for forming the 3D ink compositions.

Although the ink compositions were made with a wide variety of different particles, they could all be formulated to provide very similar rheological properties that were appropriate for 3D printing applications. This is illustrated in FIG. 1, which is a graph of the viscosity as a function of shear stress for the $Fe_2O_3$, NiO, $Fe_2O_3$+NiO, CuO and HA-based ink compositions. As shown in the graph, each of the ink compositions had a viscosity in the range from 30 to 35 Pa·S, which is an ideal 3D printing viscosity range, at room temperature and low shear stress.

In order to test the stability of the ink compositions, a quantity of the $Fe_2O_3$-based ink composition (70 vol. % $Fe_2O_3$ in PLGA) was sealed in a glass vial. The vial was kept at room temperature and observed over a period of 9 weeks. There was no observable settling-out of the $Fe_2O_3$ particles over that time period.

As illustrated in the bottom three rows of Table 1, a single ink composition may comprise more than one type of particle. These ink compositions were made, for example, by combining a first ink composition comprising 70 vol. % hydroxyapatite and 30 vol. % PLGA binder with a second ink composition comprising 70 vol. % graphene and 30 vol. % PLGA binder to create a final 3D ink composition comprising a mixture of HA and graphene particles. The HA and graphene particles had very different morphologies. The HA particles were solid spheres, approximately 10-20 μm in diameter. The graphene flakes were several nanometers thick and 5-20 μm wide/long. When the two starting ink compositions were combined, the resulting 3D printed material showed elements of both starting ink compositions. This is illustrated schematically in FIG. 2 and shown in the scanning electron micrograph (SEM) images in FIG. 3. Spherical HA particles within the HA-graphene mixture are highlighted in dashed circles in FIG. 3.

The ink compositions can be 3D printed into structures comprised of many hundreds of layers. Such structures can have very large aspect ratios (i.e., height:width). For example: the ink composition comprising 70 vol. % hydroxyapatite and 30 vol. % PLGA binder was printed into a 450+ layer, 6 mm diameter hollow cylinder using a 400 μm diameter nozzle; the ink composition comprising 60 vol. % graphene and 40 vol. % PLGA binder was printed into a 700+ layer, 5 mm diameter hollow cylinder using a 200 μm diameter nozzle; the ink composition comprising 70 vol. % hydroxyapatite and 30 vol. % PLGA binder was printed into a 400+ layer, 1 cm diameter hollow cylinder using a 400 μm diameter nozzle; and the ink composition comprising 70 vol. % Fe (iron) and 30 vol. % PLGA binder was printed into a 400+ layer, 1 cm diameter hollow cylinder using a 400 μm diameter nozzle. All cylinders were 14-14.5 cm tall. The 6 mm diameter HA-based cylinder was printed in ~15 minutes; the graphene-based cylinder was printed in 30 minutes (using a much smaller tip); and the $Fe_2O_3$-based cylinder was printed in about 20 minutes. This corresponds to printing rates of about: 25 layers/minute; 25 layers/minute; and 22 layers/minute respectively. These fast printing rates illustrate the ability of the ink compositions to solidify rapidly upon printing without becoming deformed, such that no significant drying time is required before subsequent layers can be printed.

Figures 4, 5, 6:
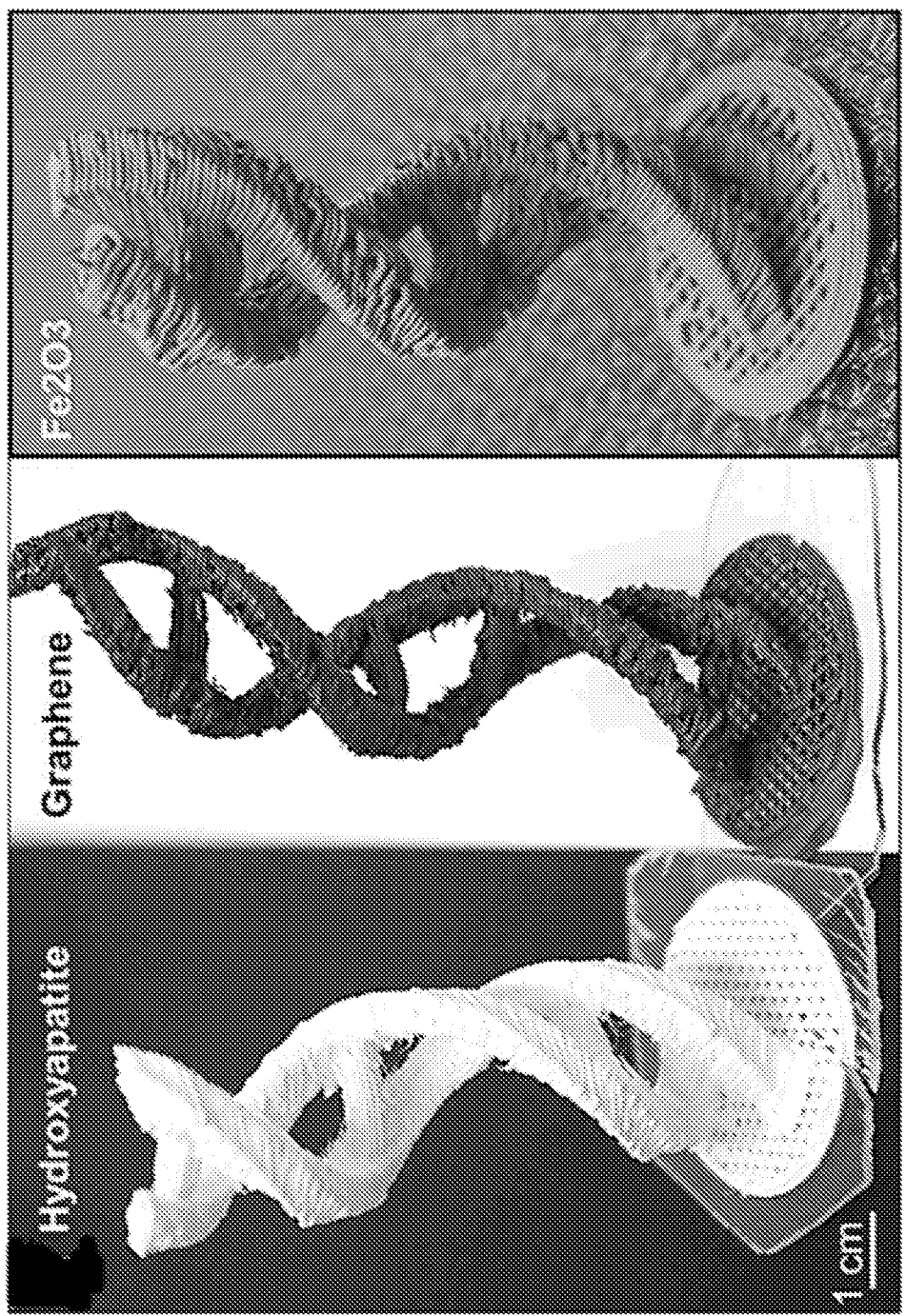
FIG. 4. 3D model of a portion of a DNA strand printed from a hydroxyapatite particle-containing 3D ink composition.
FIG. 5. 3D model of a portion of a DNA strand printed from a graphene particle-containing 3D ink composition.
FIG. 6. 3D model of a portion of a DNA strand printed from an iron oxide particle-containing 3D ink composition.
Figures 7A, 7B, 7C:
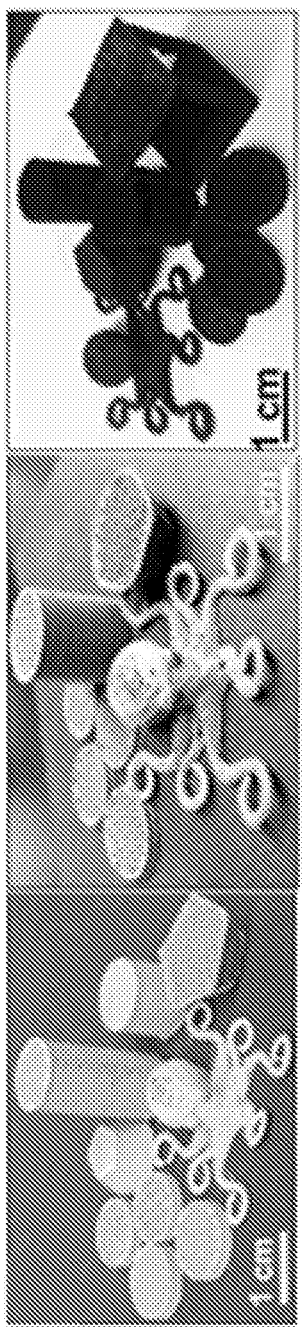
FIG. 7A. Various cylinders and a model of an octopus printed from an ink composition comprising 70 vol. % NiO.
FIG. 7B. Various cylinders and a model of an octopus printed from an ink composition comprising 70 vol. % $Fe_2O_3$+NiO.
FIG. 7C. Various cylinders and a model of an octopus printed from an ink composition comprising 70 vol. % CuO.
Figure 9:
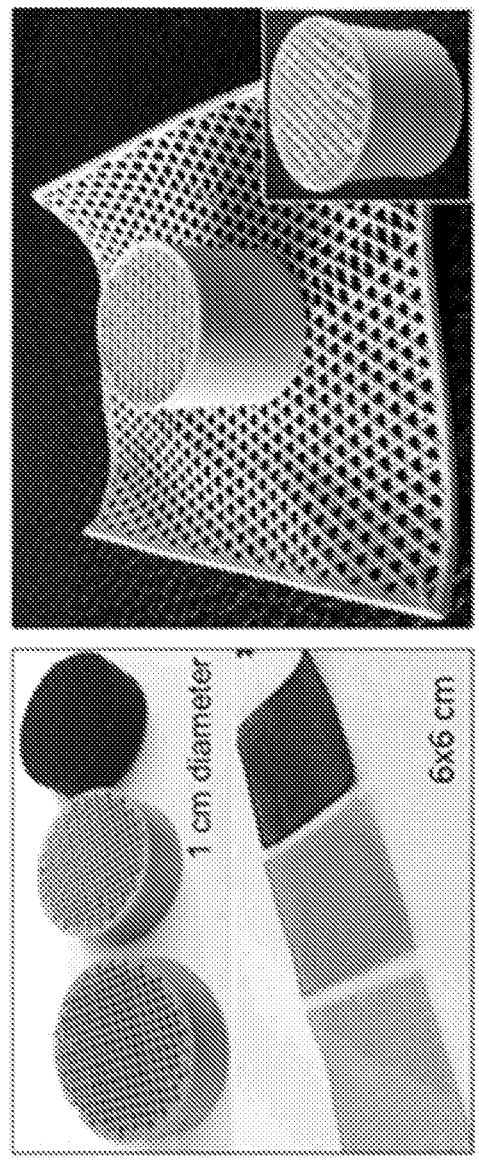
FIG. 9. A cylinder and sheet printed from an ink composition comprising 60 vol. % $CuSO_4$.

High aspect ratio objects with more complex shapes can also be 3D printed using the ink compositions. This is illustrated in FIGS. 4, 5 and 6, which show models of DNA strands that were 3D printed using the HA (70 vol. % HA/30 vol. % PLGA), graphene (60 vol. % graphene/40 vol. % PLGA), and $Fe_2O_3$ (70 vol. % $Fe_2O_3$/30 vol. % PLGA) based ink compositions, respectively. These models illustrate the ability to print many layers vertically, with extreme curvature and spanning gaps using the present 3D ink compositions.

Figure 8:
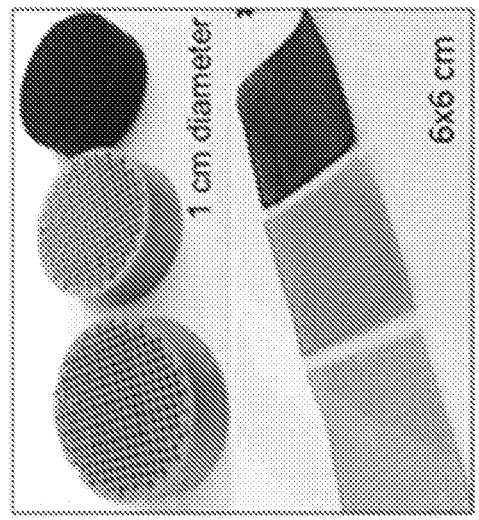
FIG. 8. Cylinders and sheets printed from ink compositions comprising 70 vol. % of the complex ceramic $Fe_2O_3$-doped YSZ (light gray), YSZ+NiO (dark gray), and LSM (black).
Figure 11:
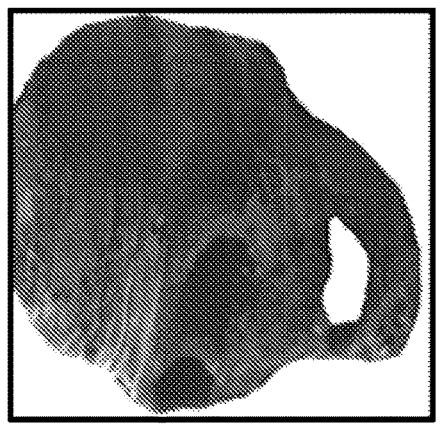
FIG. 11. A 1.5 in diameter skull printed from the ink composition comprising 60 vol. % graphene that was formed by printing the jaw and the base of the skull separately and then fusing the jaw to the base of the skull using the graphene-based ink composition as an adhesive.
Figure 10:
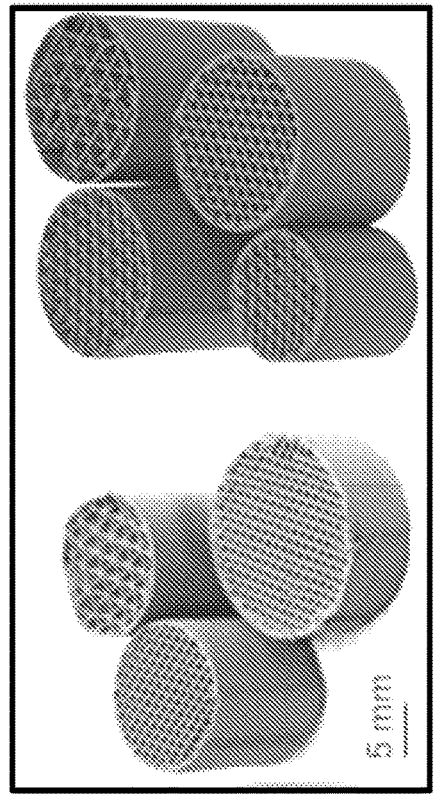
FIG. 10. Cylinders printed from an ink composition comprising 70 vol. % of the metal particles (left) iron and (right) nickel.
Figure 14:
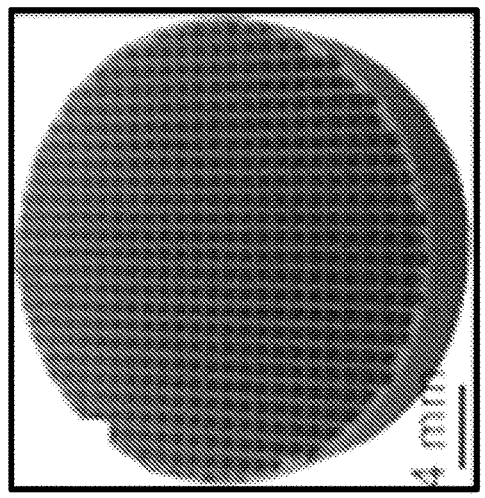
FIG. 14. A cylinder printed from an ink composition comprising 80 vol. % of a lunar soil stimulant.
Figure 13:
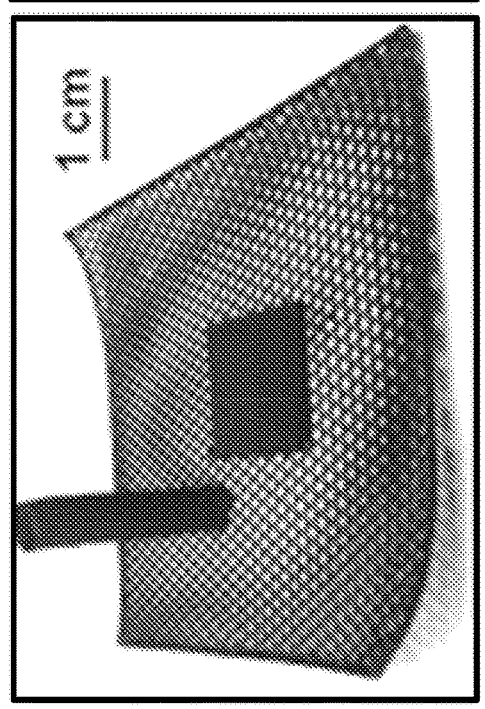
FIG. 13. A small sheet, a larger sheet and a cylinder printed from an ink composition comprising the 35, 35 vol. % HA-graphene mixture.
Figure 12:
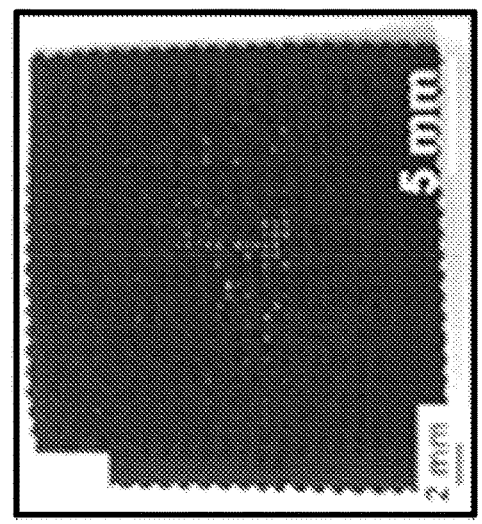
FIG. 12. A sheet printed from an ink composition comprising 60 vol. % carbon nanotubes.
Figure 21:
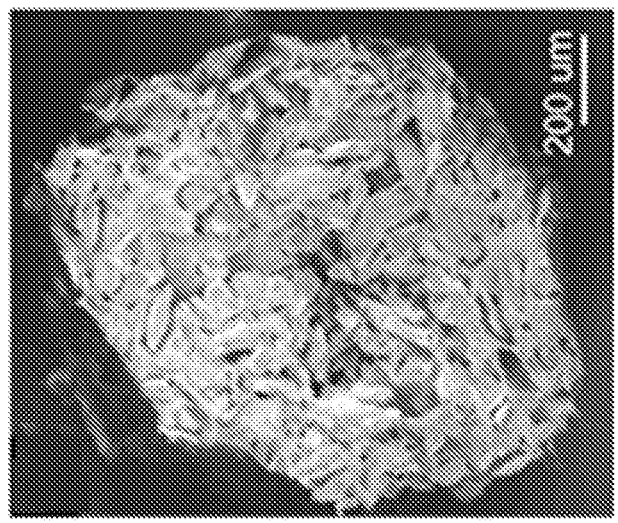
FIG. 21. An SEM image of a bone-derived extracellular matrix fiber printed from an ink composition comprising 60 vol. % of the bone extracellular matrix.
Figure 20:
FIG. 20. An SEM image of a portion of the multilayered sheet of FIG. 19.

The 3D printing process described above was utilized to produce and 3D print a variety of objects from a variety of the 3D ink compositions listed in Table 1, images of which are show in FIGS. 7-18. Representative examples illustrating the wide variety of ink compositions include: (A) various cylinders and a model of an octopus printed from the ink compositions comprising 70 vol. % NiO, $F_{e2O3}$+NiO, and CuO, as shown in FIGS. 7A, 7B and 7C, respectively; (B) cylinders and sheets printed from the ink compositions comprising 70 vol. % of the complex ceramic $F_{e2O3}$-doped YSZ (light gray), YSZ+NiO (dark gray), and LSM (black), as shown in FIG. 8; (C) a cylinder and sheet printed from the ink composition comprising 60 vol. % $CuS_{O4}$—as printed, the $CuS_{O4}$ material is gray/green in color (FIG. 9), but once exposed to moisture, it turns bright blue (inset) as the Cu ions are released; (D) cylinders printed from the ink compositions comprising 70 vol. % of the metal particles (left) iron and (right) nickel (FIG. 10); (E) a 1.5 inch diameter skull printed from the ink composition comprising 60 vol. % graphene that was formed by forming the jaw and the base of the skull separately and then fusing the jaw to the base of the skull using the graphene-based ink composition as an adhesive (FIG. 11); (F) a sheet printed from the ink composition comprising 60 vol. % carbon nanotubes (FIG. 12); (G) a small sheet, a larger sheet and a cylinder printed from the ink composition comprising the 35, 35 vol. % HA-graphene mixture (FIG. 13); (H) a cylinder printed from the ink composition comprising 80 vol. % of the lunar soil stimulant (FIG. 14.); (I) a portion of an artificial spine printed from the ink composition comprising 75 vol. % of the bioceramic HA (FIG. 15); (J) a multilayered sheet printed from the ink composition comprising 80 vol. % diatom skeleton particles (FIG. 16); (K) a sheet printed from the ink composition comprising 70 vol. % pollen particles (FIG. 17); (M) a multilayered sheet printed from the ink composition comprising a mixture of 75 vol. % HA with added 5 vol. % vancomycin antibiotic powder (FIG. 18); and (N) a multilayered sheet in the process of being 3D printed from the ink composition comprising a mixture of HA and bone extra cellular matrix (FIG. 19). FIG. 20 shows an SEM image of a portion of the multilayered sheet of FIG. 19. FIG. 21 is an SEM image of a bone-derived ECM fiber from the ink composition comprising 60 vol. % of the bone ECM.

Figure 22A:
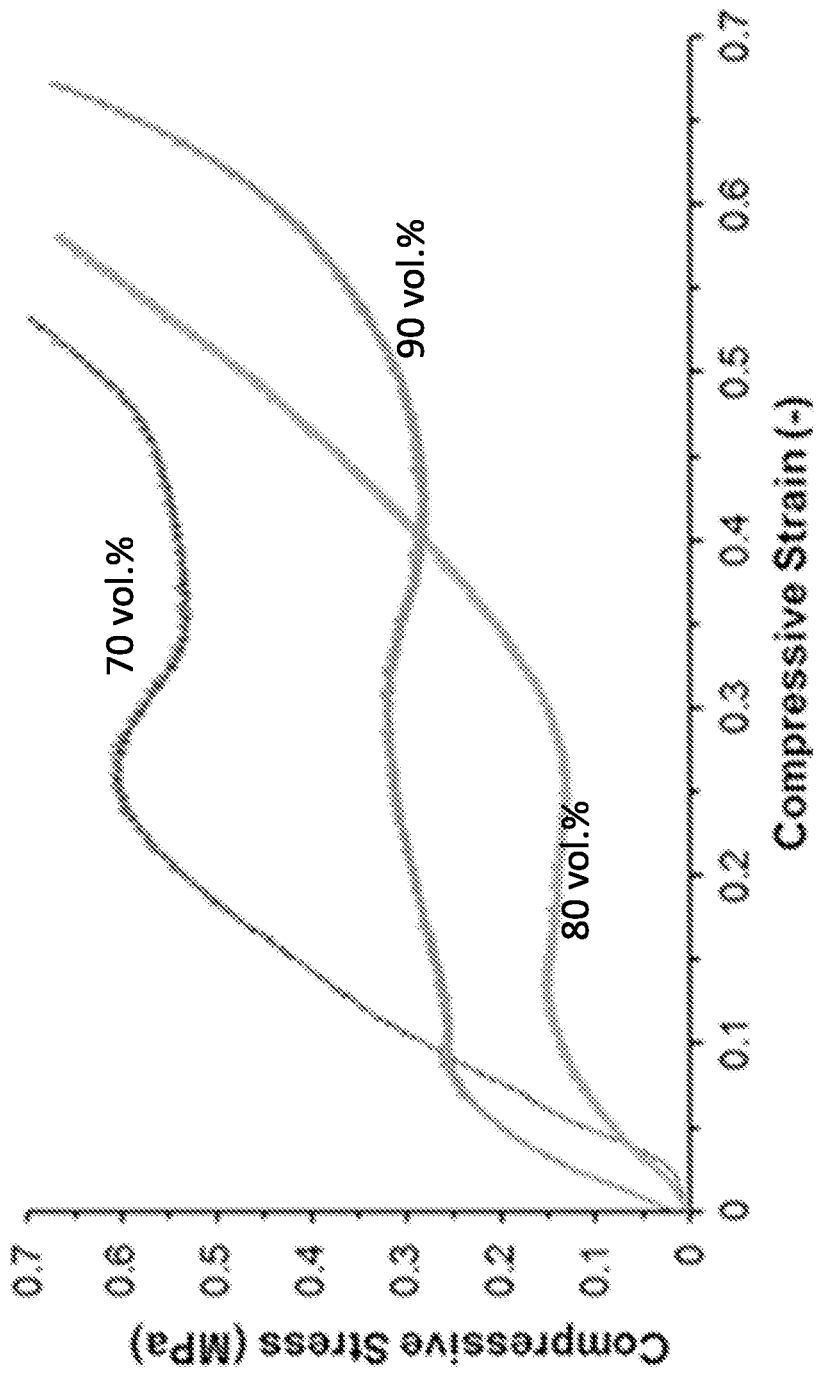
FIG. 22A. A graph of the compressive stress-strain curves for 1.5 cm tall by 1 cm diameter cylinders printed from ink compositions comprising 70, 80, and 90 vol. % $Fe_2O_3$.
Figure 22C:
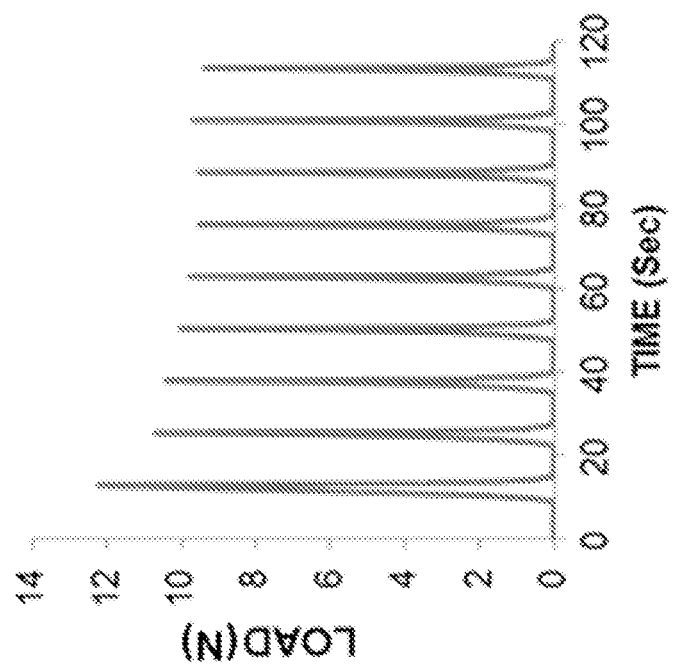
FIG. 22C. A graph of the cyclic loading profile over time of a 3D printed cylinder undergoing compress-and-release cycles.
Figure 22B:
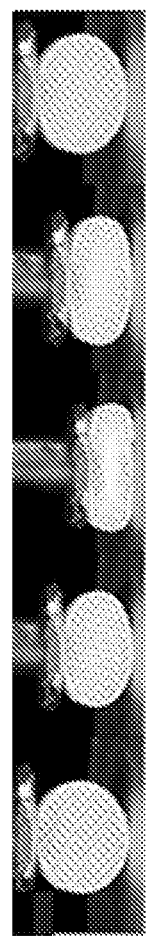
FIG. 22B. Images of a 3D printed cylinder undergo compression and then regaining its original shape.
Figure 22D:
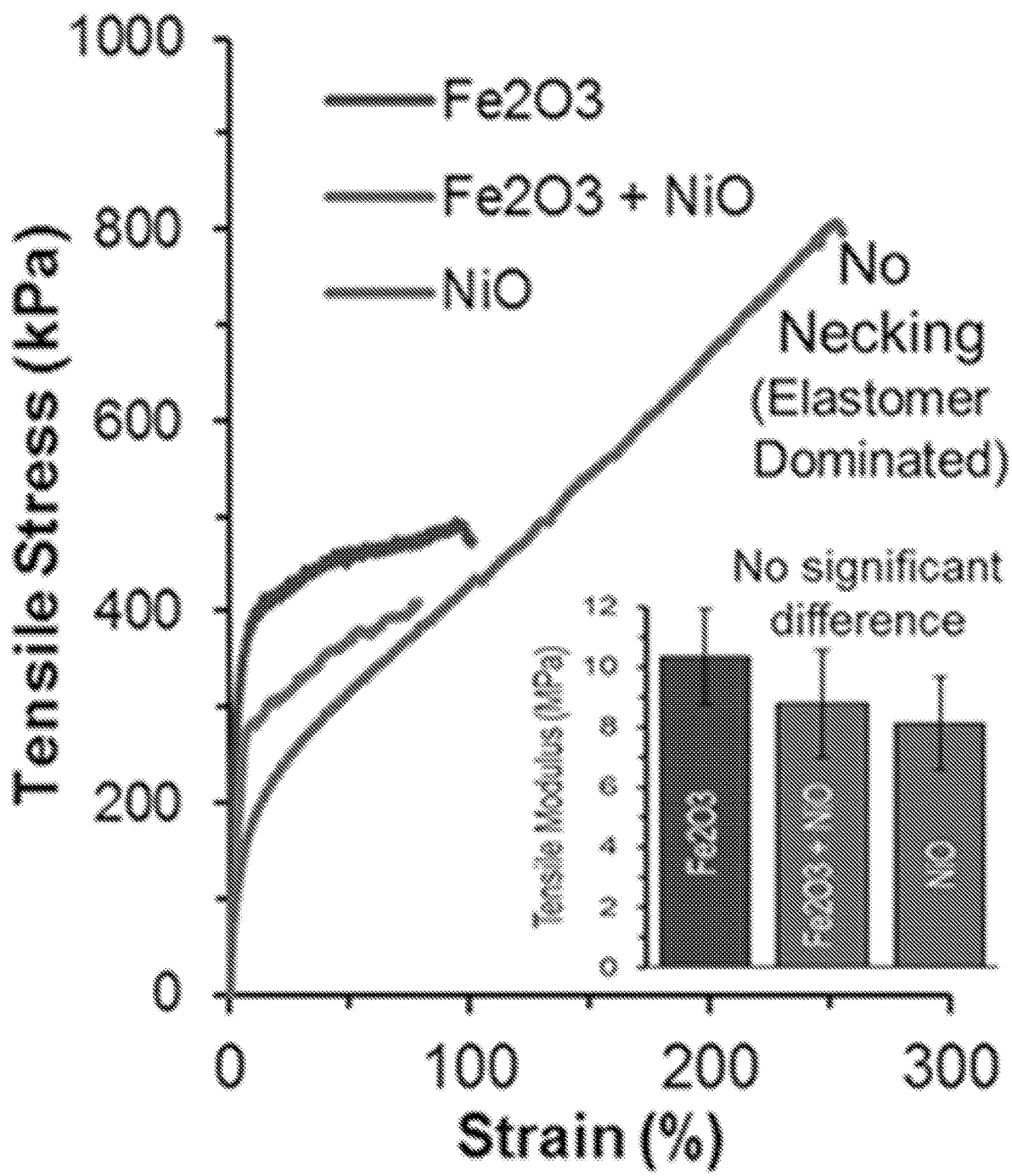
FIG. 22D. A graph of tensile stress versus strain for cylinders printed from ink compositions comprising 70 vol. % of $Fe_2O_3$, $Fe_2O_3$+NiO, and NiO.

The 3D printed objects are quite robust and do not crumble or undergo catastrophic failure even when comprised of 90 vol. % $Fe_2O_3$ particles. FIGS. 22A-22D illustrate some of the mechanical properties of the 3D printed objects made from 70 vol. %, 80 vol. % and 90 vol. % $Fe_2O_3$ particle-containing ink compositions. FIG. 22A is a graph of the compressive stress-strain curves for 1.5 cm tall by 1 cm diameter cylinders printed from ink compositions comprising 70, 80, 90 vol. % $Fe_2O_3$. The 3D printed objects even exhibited hyperelastic mechanical properties, bouncing back to their original shape after being compressed (FIG. 22B). FIG. 22C is a graph of the cyclic loading profile as a function of time, showing the recovery of strength after the compressive load is released. Finally, as shown in FIG. 22D, under tension, tensile bars comprising of 70 vol. % of the metal oxides exhibited mechanical properties similar to those of the elastomer of which they are comprised.

Figure 23C:
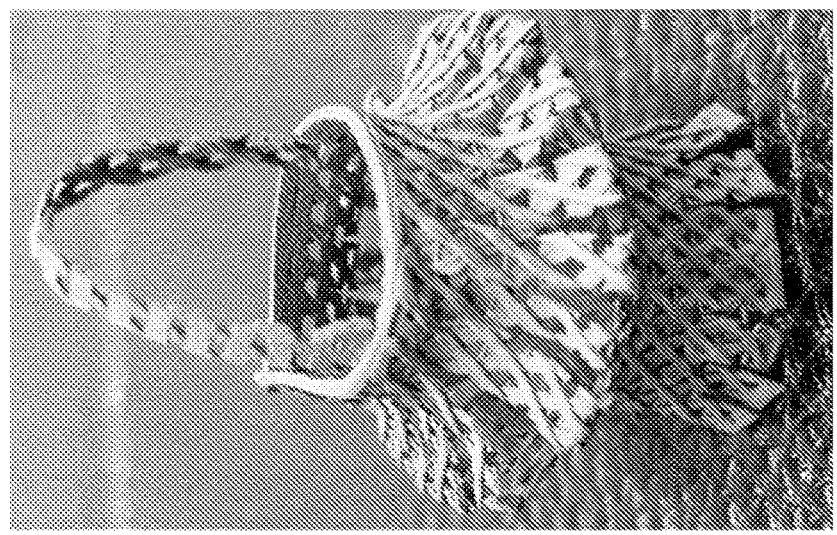
FIG. 23C. A sheet printed from an ink composition comprising 70 vol. % iron oxide being folded, cut and fused into a 2 cm diameter Chinese lantern.
Figure 23A:
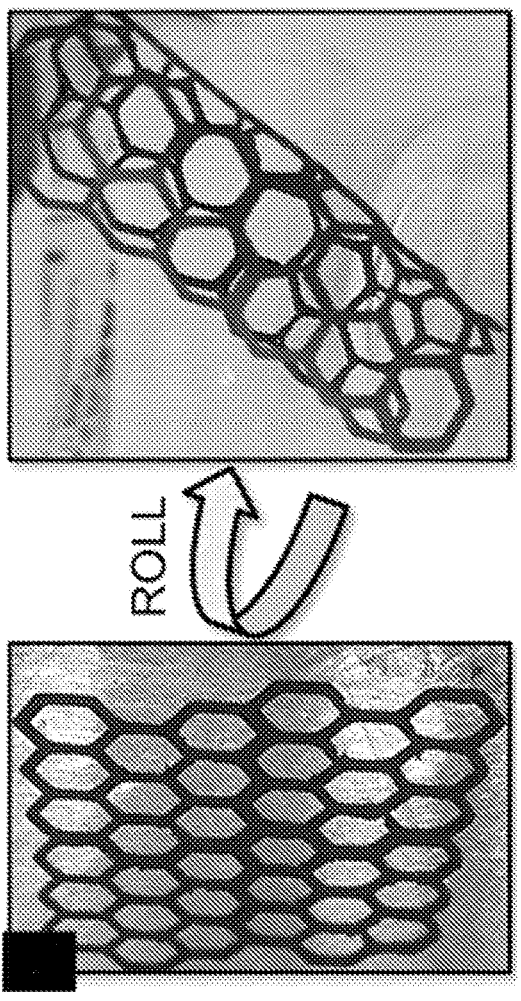
FIG. 23A. A sheet with a honeycomb pattern printed from an ink composition comprising 60 vol. % graphene being rolled into a nanotube-like shape.
Figure 23B:
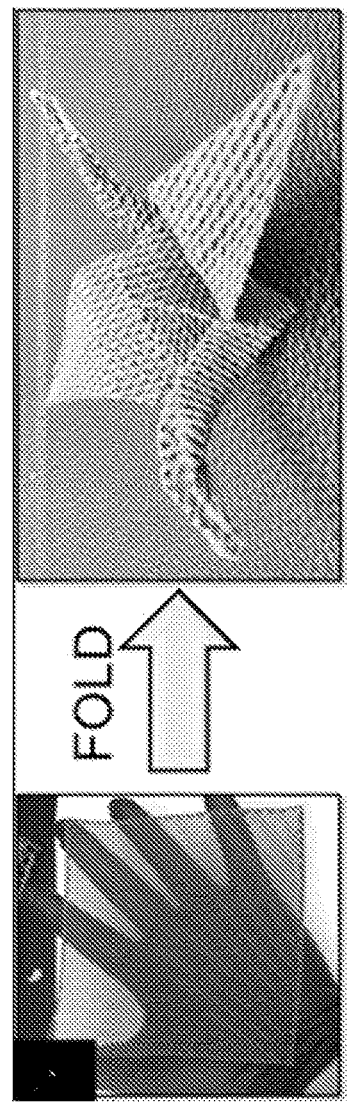
FIG. 23B. A sheet printed from an ink composition comprising 70 vol. % iron oxide being folded into an origami crane.

The robustness of objects printed from the ink compositions permitted them to be significantly manipulated despite their large particle contents. For example, sheets of material printed from the ink compositions could be rolled (FIG. 23A: shows a printed sheet made from an ink composition comprising 60 vol. % graphene being rolled into a nanotube-like shape), folded (FIG. 23B: shows a printed sheet made from an ink composition comprising 70 vol. % $Fe_2O_3$ being folded into an origami crane), and cut and folded (FIG. 23C: shows a Chinese lantern made by "kirigami", a process of folding a printed 3D sheet made from the 70 vol. % $Fe_2O_3$ ink composition, followed by cutting; the handle was printed separately and then bonded to the body of the lantern using the ink composition as an adhesive).

As noted previously, complex 3D parts can be made by fusing multiple 3D printed parts together using the ink compositions as an adhesive. This is illustrated by the skull in FIG. 11, which was produced by printing the base of skull and the jaw separately, followed by fusing the jaw to the base skull via application of the ink composition to edges of the contacting regions. The application of ink composition was done by hand: the ink composition was loaded into a standard hand syringe and applied through a fine nozzle/needle to the edges of the contacting regions.

In order to demonstrate the ability of the 3D ink compositions to print 3D structures having parts or regions comprising different types of particles, a multilayered structure was printing using the ink composition comprising 70 vol. % HA (white) to form a sheet comprising continuous strands in a first printing step and subsequently using the ink composition comprising and 60 vol. % graphene (black) to print a honeycomb pattern of strands over the sheet in a second printing step. FIG. 24A shows a portion of the resulting multilayered sheet. The self-supporting nature of the printed fibers, which substantially retain the cylindrical cross-sectional shape imparted to them by the printing nozzle, can be seen in this figure. FIG. 24B is an image of the multilayered sheet rolled up in a vial. Like the objects made from only a single ink composition, objects printed with different ink compositions (either sequentially or simultaneously) may be folded, rolled and cut.

The ability to print the ink compositions across open cavities was demonstrated by printing strands of the ink composition comprising 70 vol. % $Fe_2O_3$ over the top opening in a 3D printed box, as shown in FIG. 25, making it possible to 3D print a hollow enclosed cube, as shown in FIG. 26.

Figure 28:
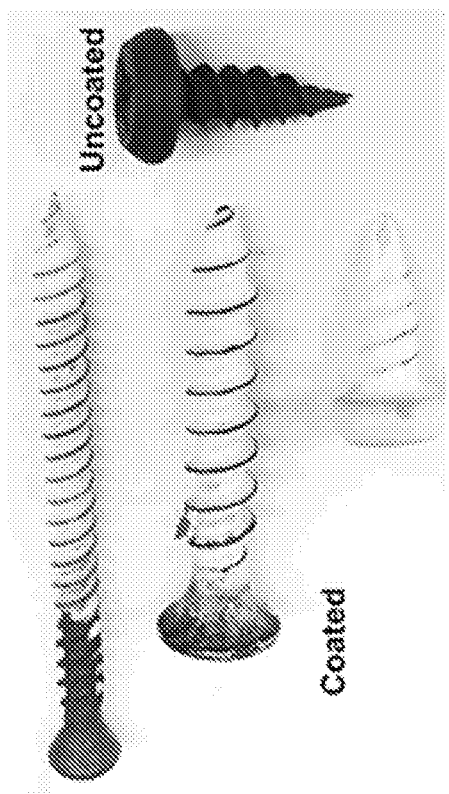
FIG. 28. Screws coated by dip coating with an ink composition comprising 75 vol. % hydroxyapatite.
Figure 29:
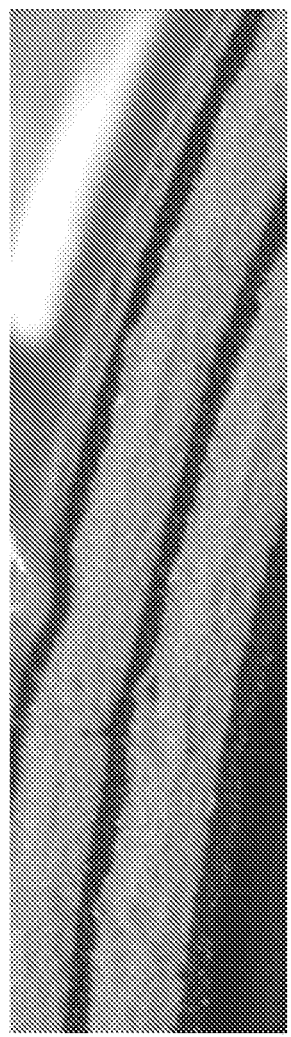
FIG. 29. A cross-sectional image of a dip coated film comprised of three ink compositions (70 vol. % LSM, 70 vol. % YSZ-NiO, and 70 vol. % YSZ) applied sequentially for a total of 9 layers.
Figure 27:
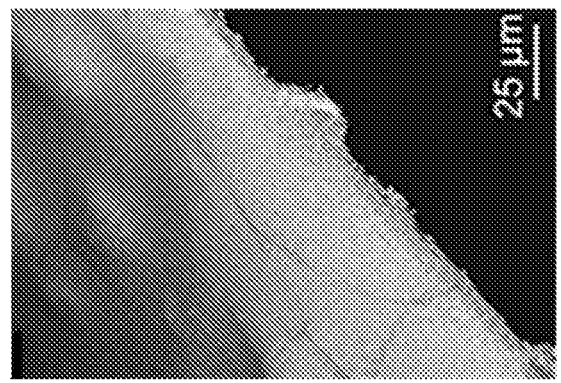
FIG. 27. SEM image of a particle-laden sheet made by dip coating with an ink composition comprising 70 vol. % $Fe_2O_3$ doped yttria stabilized zirconia.

In addition to being used as 3D printing inks, the ink compositions were used as coating compositions. Prior to the complete evaporation of the solvents in the solvent system, the ink compositions were used to create thin, particle-laden films via dip coating and were also used to coat existing bulk objects, and to create smart, responsive fabric-like sheets. For example, particle-laden sheets were made by dip coating a glass slide with an ink composition comprising 70 vol. % $Fe_2O_3$-doped YSZ particles. The SEM image in FIG. 27 shows that the sheets, which were quite robust, were on the order of 5 µm-thick. Coatings on bulk objects made by dip coating ink compositions comprising 75 vol. % hydroxyapatite onto screws are shown in FIG. 28. In addition, through sequentially dip coating multiple-layers of the ink compositions, a thicker film of the printed material can be conformally built up on the dipping substrate. For example, a glass slide was dip coated using three different ink compositions (70 vol. % LSM, 70 vol. % YSZ-NiO, and 70 vol. % YSZ) to provide a coating with three characteristic regions along its length. The compositions of the regions from one end of the coating to the other were as follows: 70 vol. % LSM; 70 vol. % LSM–70 vol. % YSZ-NiO; and 70 vol. % LSM–70 vol. % YSZ-NiO–70 vol. % YSZ. This process can be repeated over and over again, to build up many layers, which can then be physically removed from the substrate. This is illustrated in FIG. 29 which shows a cross-sectional image of a dip coated film comprised of the three ink compositions (70 vol. % LSM, 70 vol. % YSZ-NiO, and 70 vol. % YSZ) applied sequentially for a total of 9 layers. The resulting multi-film in this instance is approximately 150 µm thick.

Finally, in order to test the stability of the objects in water, an object printed from an ink composition comprising $Fe_2O_3$ powder was submerged in water for six months and showed no sign of degrading or dissolving.

Figure 31:
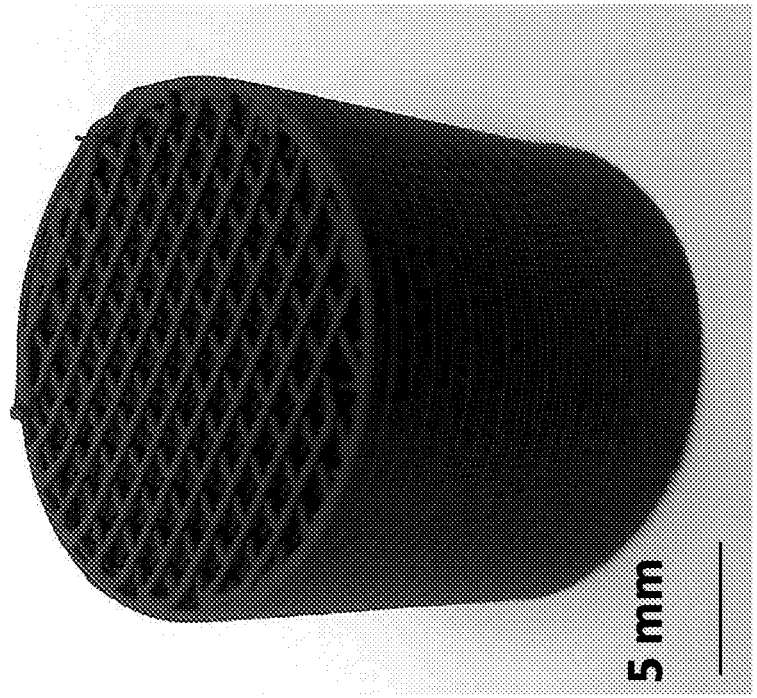
FIG. 31 is an image of a cylinder printed using an ink composition comprising 70 vol. % CuO and 30 vol. % PCL.
Figure 30:
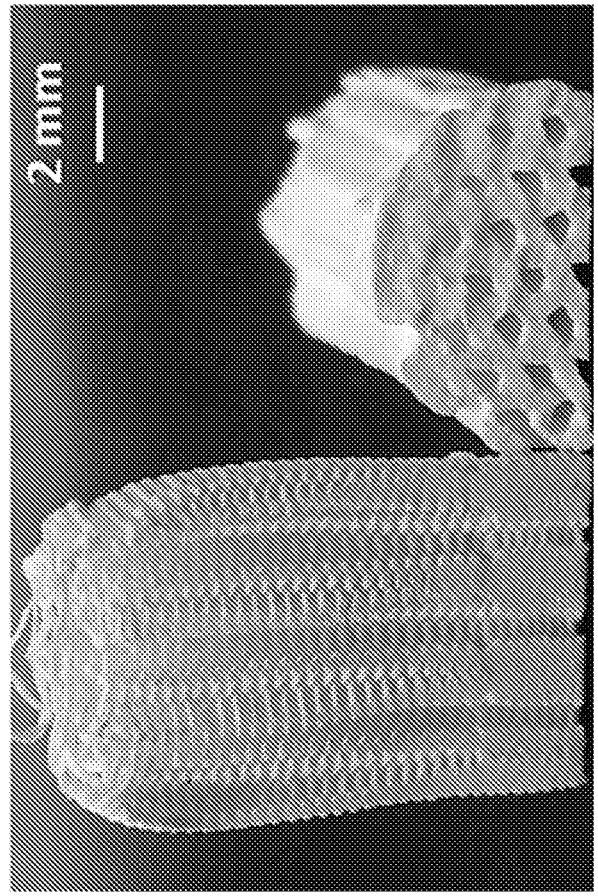
FIG. 30 shows a length view (left) and a cross-sectional view (right) of an image of a cylinder printed from an ink composition comprising 70 vol. % HA particles.

3D objects were also printed using polyester binders other than PLGA. FIG. 30 shows a length view (left) and a cross-sectional view (right) of an image of a cylinder printed from an ink composition comprising 70 vol. % HA particles and 30 vol. % PLA, based on its solid content. The cylinder was printed using a 200 µm nozzle diameter and comprised more than 100 vertically stacked printed layers. FIG. 31 is an image of a cylinder printed using an ink composition comprising 70 vol. % CuO and 30 vol. % PCL, based on its solids content. The cylinder was printed using a 400 µm nozzle diameter and comprised more than 50 vertically stacked printed layers. The ink compositions used to form the objects shown in FIGS. 30 and 31 were formulated according to the procedure described above.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An ink composition for extruding a fiber, for printing a three-dimensional object, or for coating a three-dimensional object to be coated, the ink composition comprising:
    a solvent system comprising at least a primary organic solvent and one or more additional organic solvents, the one or more additional organic solvents having lower vapor pressure(s) than the primary organic solvent at a desired temperature and pressure for the extruding, for the printing, or for the coating; and
    a solids content comprising:
        a polymer that is soluble in the solvent system at the desired temperature and pressure; and
        solid particles that are insoluble in the solvent system at the desired temperature and pressure;
    wherein the solid particles are at least 50 vol. % of the solids content; and
    wherein at least one of the one or more additional organic solvents is a surfactant or a plasticizer.

2. The ink composition of claim 1 wherein a first one of the one or more additional organic solvents is a surfactant and a second one of the one or more additional organic solvents is a plasticizer.

3. The ink composition of claim 1 wherein the polymer acts as a binder for holding the solid particles together in the extruded fiber, in the printed three-dimensional object, or in the coating on the three-dimensional object to be coated.

4. The ink composition of claim 1 wherein the polymer comprises polyester.

5. The ink composition of claim 1 wherein the primary organic solvent has a vapor pressure from between 20 kPa to about 60 kPa at 23° C. and atmospheric pressure and the one or more additional organic solvents have vapor pressure(s) below 20 kPa at 23° C. and atmospheric pressure.

6. The ink composition of claim 1 wherein the primary organic solvent is dichloromethane, chloroform, or a mixture thereof.

7. The ink composition of claim 1 wherein the primary organic solvent is at least 50 vol. % of the solvent system.

8. The ink composition of claim 1,
    wherein the polymer comprises one or more of polyester, polyacrylate, polylactic-co-glycolic acid, polycaprolactone, polylactic acid, glycolic acid, polyethylene, polyethylene glycol, or a combination thereof; and
    wherein the solid particles comprise one or more of ceramic particles, metal particles, metal oxide particles, metal alloy particles, magnetic particles, carbon particles, salt particles, bioceramic particles, graphene particles, natural soil particles, planetary soil particles, naturally occurring particles derived from biological sources, organic particles, inorganic particles, or a combination thereof.

9. A method of making the ink composition of claim 1, the method comprising:
    mixing the primary organic solvent, the one or more additional organic solvents, the polymer, and the solid particles.

10. The method of claim 9, further comprising: allowing at least some of the primary solvent to evaporate.

11. The method of claim 9, the mixing step comprising mixing at least two different types of solid particles with the polymer and the solvent system.

12. A method of making an ink composition, the method comprising:
    making each of at least two ink compositions as in claim 9, using a different type of solid particles in making each of the at least two ink compositions; and
    combining all of the at least two ink compositions.

13. A method of coating the three-dimensional object to be coated, the method comprising:
    making the ink composition as in claim 9; and
    prior to complete evaporation of the solvents in the solvent system, coating the three-dimensional object to be coated with the ink composition.

14. The method of claim 13, the ink composition comprising 70 vol. % $Fe_2O_3$-doped yttria-stabilized zirconia (YSZ) particles.

15. The method of claim 13, the ink composition comprising 75 vol. % hydroxyapatite.

16. The method of claim 13, further comprising: repeating the coating step to apply multiple layers of the ink composition on the three-dimensional object to be coated.

17. The method of claim 13,
    the making step comprising making a plurality of different ink compositions; and
    the coating step comprising sequentially coating the three-dimensional object to be coated with the different ink compositions to provide a coating with different characteristic regions.

18. The method of claim 17, further comprising: repeating the coating step to apply multiple layers of the ink compositions on the three-dimensional object to be coated.

19. The method of claim 13, the coating being selected from a group consisting of painting, dip coating and spin coating.

20. A method of printing the three-dimensional object, the method comprising:
    extruding the ink composition of claim 1 to form a printed layer; and
    forming the printed three-dimensional object, comprising multiple, vertically stacked printed layers, by performing the extruding step repeatedly;
    wherein repeating the extruding step comprises forming subsequently printed layers on top of previously formed printed layers, and each of the subsequently printed layers bonding to a previously formed printed layer on which that subsequently printed layer is deposited.

21. The method of claim 20, further comprising: at least some of the primary organic solvent in each previously formed printed layer evaporating before extrusion of a subsequently printed layer on top of that previously formed printed layer.

22. The method of claim 20, further comprising:
    rolling, folding, or mechanically manipulating the printed three-dimensional object after drying of the printed three-dimensional object;
    wherein the printed three-dimensional object remains flexible and resilient, without application of solvents to the printed three-dimensional object after drying of the printed three-dimensional object.

23. The method of claim 20, wherein the printed three-dimensional object has an aspect ratio of at least 10:1, without any reconfiguration of a lower aspect ratio precursor printed object.

24. The method of claim 20, wherein a shape and structural integrity of the multiple, vertically stacked printed layers is maintained without permanent deformation of any of the printed layers.

25. The method of claim 20, further comprising: selectively removing one or more sections of the printed three-dimensional object by applying the primary organic solvent to those one or more sections of the printed three-dimensional object.

26. The method of claim 20, wherein the solids content is substantially not soluble in water, the method further comprising:
the forming step further comprising providing one or more water soluble sacrificial support structures upon which at least a part of at least one of the printed layers is deposited; and
removing the one or more sacrificial support structures by applying water to the one or more sacrificial support structures.

27. The method of claim 20, wherein
repeating the extruding step comprises extruding a plurality of different ink compositions; and
the printed three-dimensional object comprises a multi-material printed three-dimensional object.

28. A method of making a multi-part three-dimensional object, the method comprising:
making one part of the multi-part three-dimensional object as in claim 20; and
using the ink composition as a self-adhesive to fuse the one part to another part of the multi-part three-dimensional object.

29. An ink composition for extruding a fiber, for printing a three-dimensional object, or for coating a three-dimensional object to be coated, the ink composition comprising:
a solvent system comprising at least a primary organic solvent and one or more additional organic solvents, the one or more additional organic solvents having lower vapor pressure(s) than the primary organic solvent at a desired temperature and pressure for the extruding, for the printing, or for the coating; and
a solids content comprising:
a polymer that is soluble in the solvent system at the desired temperature and pressure; and
solid particles that are insoluble in the solvent system at the desired temperature and pressure;
wherein the solid particles are at least 50 vol. % of the solids content; and
wherein the primary organic solvent has a vapor pressure from between 20 kPa to about 60 kPa at 23° C. and atmospheric pressure and the one or more additional organic solvents have vapor pressure(s) below 20 kPa at 23° C. and atmospheric pressure.

30. A method of making the ink composition of claim 29, the method comprising:
mixing the primary organic solvent, the one or more additional organic solvents, the polymer, and the solid particles.

31. A method of making an ink composition, the method comprising:
making each of at least two ink compositions as in claim 30, using a different type of solid particles in making each of the at least two ink compositions; and
combining all of the at least two ink compositions.

32. A method of coating the three-dimensional object to be coated, the method comprising:
making the ink composition as in claim 30; and
prior to complete evaporation of the solvents in the solvent system, coating the three-dimensional object to be coated with the ink composition.

33. A method of printing the three-dimensional object, the method comprising:
extruding the ink composition of claim 29 to form a printed layer; and
forming the printed three-dimensional object, comprising multiple, vertically stacked printed layers, by performing the extruding step repeatedly;
wherein repeating the extruding step comprises forming subsequently printed layers on top of previously formed printed layers, and each of the subsequently printed layers bonding to a previously formed printed layer on which that subsequently printed layer is deposited.

34. A method of making a multi-part three-dimensional object, the method comprising:
making one part of the multi-part three-dimensional object as in claim 33; and
using the ink composition as a self-adhesive to fuse the one part to another part of the multi-part three-dimensional object.

35. An ink composition for extruding a fiber, for printing a three-dimensional object, or for coating a three-dimensional object to be coated, the ink composition comprising:
a solvent system comprising at least a primary organic solvent and one or more additional organic solvents, the one or more additional organic solvents having lower vapor pressure(s) than the primary organic solvent at a desired temperature and pressure for the extruding, for the printing, or for the coating; and
a solids content comprising:
a polymer that is soluble in the solvent system at the desired temperature and pressure; and
solid particles that are insoluble in the solvent system at the desired temperature and pressure;
wherein the solid particles are at least 50 vol. % of the solids content; and
wherein the primary organic solvent is dichloromethane, chloroform, or a mixture thereof.

36. A method of making the ink composition of claim 35, the method comprising:
mixing the primary organic solvent, the one or more additional organic solvents, the polymer, and the solid particles.

37. A method of making an ink composition, the method comprising:
making each of at least two ink compositions as in claim 36, using a different type of solid particles in making each of the at least two ink compositions; and
combining all of the at least two ink compositions.

38. A method of coating the three-dimensional object to be coated, the method comprising:
making the ink composition as in claim 36; and
prior to complete evaporation of the solvents in the solvent system, coating the three-dimensional object to be coated with the ink composition.

39. A method of printing the three-dimensional object, the method comprising:
- extruding the ink composition of claim 35 to form a printed layer; and
- forming the printed three-dimensional object, comprising multiple, vertically stacked printed layers, by performing the extruding step repeatedly;
- wherein repeating the extruding step comprises forming subsequently printed layers on top of previously formed printed layers, and each of the subsequently printed layers bonding to a previously formed printed layer on which that subsequently printed layer is deposited.

40. A method of making a multi-part three-dimensional object, the method comprising:
- making one part of the multi-part three-dimensional object as in claim 35; and
- using the ink composition as a self-adhesive to fuse the one part to another part of the multi-part three-dimensional object.

* * * * *